United States Patent
Karamcheti et al.

(10) Patent No.: US 7,818,489 B2
(45) Date of Patent: Oct. 19, 2010

(54) INTEGRATING DATA FROM SYMMETRIC AND ASYMMETRIC MEMORY

(75) Inventors: Vijay Karamcheti, Los Altos, CA (US); Kenneth A. Okin, Saratoga, CA (US); Kumar Ganapathy, Los Altos, CA (US); Ashish Singhai, Cupertino, CA (US); Rajesh Parekh, Los Altos, CA (US)

(73) Assignee: Virident Systems Inc., Milpitas, CA (US)

( * ) Notice: Subject to any disclaimer, the term of this patent is extended or adjusted under 35 U.S.C. 154(b) by 525 days.

(21) Appl. No.: 11/935,275

(22) Filed: Nov. 5, 2007

(65) Prior Publication Data

US 2008/0177978 A1    Jul. 24, 2008

Related U.S. Application Data

(60) Provisional application No. 60/864,399, filed on Nov. 4, 2006.

(51) Int. Cl.
*G06F 13/00* (2006.01)

(52) U.S. Cl. ................ 711/101; 711/103; 711/146; 711/170

(58) Field of Classification Search ............ 711/101, 711/103, 146, 170
See application file for complete search history.

(56) References Cited

U.S. PATENT DOCUMENTS

| | | | |
|---|---|---|---|
| 4,757,533 A | 7/1988 | Allen et al. | |
| 5,012,408 A | 4/1991 | Conroy | |
| 5,404,485 A | 4/1995 | Ban | |
| 6,393,545 B1 | 5/2002 | Long et al. | |
| 6,549,959 B1 | 4/2003 | Yates et al. | |
| 6,564,326 B2 | 5/2003 | Helbig | |
| 6,970,968 B1 | 11/2005 | Holman | |
| 2002/0051350 A1 | 5/2002 | Take | |
| 2002/0118593 A1 | 8/2002 | Takemae | |
| 2002/0133684 A1* | 9/2002 | Anderson | 711/200 |
| 2002/0138600 A1 | 9/2002 | Singhal | |
| 2003/0137862 A1 | 7/2003 | Brunelle et al. | |
| 2003/0188083 A1 | 10/2003 | Kumar et al. | |
| 2004/0117581 A1 | 6/2004 | Lee | |
| 2004/0160835 A1 | 8/2004 | Altman et al. | |
| 2004/0186948 A1 | 9/2004 | Lofgren et al. | |
| 2004/0193783 A1 | 9/2004 | Sharma et al. | |

(Continued)

OTHER PUBLICATIONS

Office Action for U.S. Appl. No. 11/864,763, dated Jun. 16, 2008, 11 pages.

(Continued)

*Primary Examiner*—Reba I Elmore
(74) *Attorney, Agent, or Firm*—Fish & Richardson P.C.

(57) ABSTRACT

Data stored within symmetric and asymmetric memory components of main memory is integrated by identifying a first data as having access characteristics suitable for storing in an asymmetric memory component. The first data is included among a collection of data to be written to the asymmetric memory component. An amount of data is identified within the collection of data to be written to the asymmetric memory component. The amount of data is compared within the collection of data to a volume threshold to determine whether a block write to the asymmetric memory component is justified by the amount of data. If justified, the collection of data is loaded to the asymmetric memory component.

50 Claims, 22 Drawing Sheets

U.S. PATENT DOCUMENTS

| | | | |
|---|---|---|---|
| 2005/0044303 | A1 | 2/2005 | Perego et al. |
| 2005/0166026 | A1 | 7/2005 | Ware et al. |
| 2005/0235131 | A1 | 10/2005 | Ware |
| 2005/0240745 | A1 | 10/2005 | Iyer et al. |
| 2005/0251617 | A1 | 11/2005 | Sinclair et al. |
| 2005/0273570 | A1 | 12/2005 | DeSouter et al. |
| 2005/0289317 | A1 | 12/2005 | Liou et al. |
| 2006/0106984 | A1 | 5/2006 | Bartley et al. |
| 2006/0149857 | A1 | 7/2006 | Holman |
| 2006/0230250 | A1 | 10/2006 | Klint et al. |

OTHER PUBLICATIONS

International Search Report and Written Opinion for International Application No. PCT/US07/80015, dated Aug. 13, 2008, 13 pages.

Lee, H.G., and Chang, N., "Energy-Aware Memory allocation in Heterogeneous Non-Volatile Memory Systems," *Low Power Electronics and Design*, Aug. 2003, retrieved from http://ieeexplore.ieee.org/iel5/8720/27594/01231941.pdf?tp=&isnumber=&arnumber=12394> on May 1, 2008.

Tseng, H.W., et al., "An Energy-Efficient Virtual Memory System with Flash Memory as the Secondary Storage," *Low Power Electronics and Design*, Oct. 4-6, 2006, retrieved from http://ieeexplore.ieee.org/xpls/abs_all.jsp?arnumber=4271879> May 1, 2008.

International Search Report and Written Opinion for International Application No. PCT/US07/83669, dated April 30, 2008, 9 pages.

International Search Report and Written Opinion for International Application No. PCT/US07/83671, dated May 22, 2008, 14 pages.

International Search Report and Written Opinion for International Application No. PCT/US07/83668, dated May 15, 2008, 8 pages.

International Search Report and Written Opinion for International Application No. PCT/US07/83666, dated April 21, 2008, 9 pages.

International Search Report and Written Opinion for International Application No. PCT/US07/79622, dated April 9, 2008, 12 pages.

* cited by examiner

INTEGRATING DATA FROM SYMMETRIC AND ASYMMETRIC MEMORY

CROSS-REFERENCE TO RELATED APPLICATIONS

This application claims priority to U.S. Provisional Application No. 60/864,399, entitled, "MEMORY MANAGEMENT OF HYBRID MAIN MEMORY INCLUDING SYMMETRIC AND ASYMMETRIC MEMORY," and filed on Nov. 4, 2006.

TECHNICAL FIELD

This document relates to the configuration and use of main memory, including symmetric and asymmetric memory components, within a computer system.

BACKGROUND

Main memory is memory that is accessible to a central processing unit ("CPU") of a computer or electronic device. Main memory is used to store data that is deemed likely to be actively used by the CPU.

SUMMARY

In one general sense, data stored within symmetric and asymmetric memory components of main memory is integrated. The resultant integrated data is stored within at least one asymmetric memory component. The symmetric memory components are each configured to enable random access write operations in which an address within a block of the symmetric memory component is written without affecting the availability of other addresses within the block of the symmetric memory component. The asymmetric memory components are each configured to enable block write operations in which a write to an address within a block of one of the asymmetric memory components affects the availability of other addresses within the block of the asymmetric memory component.

A write command to write data to a virtual address associated with a first physical address of an asymmetric memory component of the main memory is received. A page table is configured to change an association of the virtual address from the association to the first physical address of the asymmetric memory component of the main memory to a second physical address of a symmetric memory component of the main memory. An indication that the first physical address is no longer being used is generated to enable association of the first physical address with another virtual address in a subsequent block write operation. A collection of content entries with access characteristics suitable for storage in the asymmetric memory component is generated. It is determined whether the collection of content entries collectively occupy a threshold amount of storage or whether a threshold period of time has elapsed. In response to determining that the collection of content entries collectively occupy the threshold amount of storage or that the threshold period of time has elapsed, the collection of content entries is loaded to a region of the asymmetric memory component using a block write command.

Implementations may include one or more of the following features. For example, loading the collection of content entries to the region of the asymmetric memory component may include loading the collection of content entries to a region of the asymmetric memory component that is associated with the first physical address using a block write command. The asymmetric memory component of main memory includes NOR flash and the symmetric memory component may include dynamic random access memory (DRAM). In addition, a write command is received to write data to virtual address associated with a first physical address that maps to the NOR flash memory, and a page table is configured to change an association of the virtual address from the association to the first physical address that maps to the NOR flash memory to a second physical address that maps to DRAM memory. Association of the first physical address with another virtual address is enabled and a collection of content entries of content is generated with access characteristics suitable for storage in the NOR flash memory. It is determined whether the collection of content entries of content includes a threshold amount of storage and the collection of content entries is loaded to the NOR flash using a block write command in response to determining whether the collection of content entries of content requires the threshold amount of storage.

Loading, in response to determining whether the collection of content entries of content requires the threshold amount of storage, the collection of content entries to the NOR flash may include loading, in response to determining whether the collection of content entries of content requires the threshold amount of storage, the collection of content entries to the NOR flash that is proximate to the first physical address. Generating the collection of content entries may include organizing, in symmetric memory, an amount of data to be written corresponding to a size of a sector within a bank of NOR flash. Generating the collection of content entries may include organizing, in symmetric memory, an amount of data to be written corresponding to a size of multiple blocks within a disruption region of the asymmetric memory component in which a write to an address within a block of one of the asymmetric memory components affects the availability of other addresses within the disruption region of the asymmetric memory component. Organizing the amount of data may include structuring each block to include more than a first threshold of data and less than a second threshold of data.

Structuring each block to include more than the first threshold of data and less than the second threshold of data may include structuring each block to include more than the first threshold of data and less than the second threshold of data in response to determining that a system is not constrained for memory resources. Each block may be structured to support a sequential addition of data within the block.

Organizing the amount of data may include structuring a first block within the disruption region to include more than a first threshold of data, in response to determining that a particular write instruction configured to load data to the first block exceeds the first threshold, identifying a second block of data, and organizing additional data to be loaded to the second block of data.

Structuring the amount of block writes may include identifying a threshold amount of data for a disruption region, organizing the threshold amount of data into a collection of block organizations, and configuring a memory controller to load the collection of block organizations into the disruption region. Organizing the amount of data may include identifying virtual addresses that were previously mapped to asymmetric memory component and that now map to symmetric memory, tracking the identified virtual addresses, identifying candidates with access characteristics suitable for use in asymmetric memory component identifying a capacity threshold that indicates approximately a maximum amount of data that can be loaded to a memory structure that includes either a disruption region or a block, organizing the candidates into a memory structure, determining whether the identified candidates include a capacity threshold of data, loading, in response to determining that the identified candidates include a capacity threshold of data, the identified candidates to the memory structure, and accumulating, in response to determining that the identified candidates do not include a capacity threshold of data, additional candidates until a capacity threshold of data is available to load to the memory structure.

Identifying the capacity threshold may include identifying the capacity threshold in response to determining that a system is constrained for memory resources. A disruption region in the asymmetric memory component may be identified, and one or more blocks within the disruption region may be identified. It may be determined that the one or more blocks within the disruption region do not need to replaced and that the collection of content entries can be added sequentially using a sequential write to the one or more blocks within the asymmetric memory component. The collection of content entries may be added to the disruption region using a sequential write.

A sequential add threshold may be used that is different than the threshold amount of storage in response to determining that the collection of content entries can be added sequentially using the sequential write to the one or more blocks within the asymmetric memory component. Determining whether the collection of content entries collectively occupy the threshold amount of storage or whether the threshold period of time has elapsed may include specifying the threshold amount of storage based on a utilization level of the main memory. Determining whether the collection of content entries collectively occupy the threshold amount of storage or whether the threshold period of time has elapsed includes specifying the threshold amount of storage in response to identifying a state for a component within the asymmetric memory component. Determining whether the collection of content entries collectively occupy the threshold amount of storage or whether the threshold period of time has elapsed may include requiring that the collection of entries be written to the asymmetric memory component even if the collection of entries do not occupy the threshold amount of storage. Determining whether the collection of content entries collectively occupy the threshold amount of storage or whether the threshold period of time has elapsed may includes identifying an impact of loading the collection of entries to the region of the asymmetric memory component and specifying the threshold amount of storage in response to identifying the impact.

In another general sense, data stored within symmetric and asymmetric memory components of main memory may be integrated and the resultant integrated data is stored within at least one asymmetric memory component. The symmetric memory components are each configured to enable random access write operations in which an address within a block of the symmetric memory component is written without affecting the availability of other addresses within the block of the symmetric memory component. The asymmetric memory components are each configured to enable block write operations in which a write to an address within a block of one of the asymmetric memory components affects the availability of other addresses within the block of the asymmetric memory component.

First data is identified as having access characteristics suitable for storing in an asymmetric memory component. The first data is included among a collection of data to be written to the asymmetric memory component, and an amount of data within the collection of data to be written to the asymmetric memory component is identified.

The amount of data within the collection of data is compared to a volume threshold to determine whether a block write to the asymmetric memory component is justified by the amount of data, and if justified, loading the collection of data to the asymmetric memory component.

Implementations may include one or more of the following features. For example, identifying the first data as having the access characteristics suitable for storing in the asymmetric memory component may include determining that the first data is an update to second data that was previously stored in the asymmetric memory component. Including the first data among a collection of data to be written to the asymmetric memory component may include loading the first data to an organization location in a symmetric memory component.

Loading the first data to the organization location in the symmetric memory component may include loading the first data from an original location in the asymmetric memory component. Loading the first data to the organization location in the symmetric memory component may include loading the first data from an original location in the symmetric memory component.

Including the first data among a collection of data to be written to the asymmetric memory component may include structuring the first data in a block format for use in a block write. Including the first data among a collection of data to be written to the asymmetric memory component may include structuring the first data in a specialized format for use in a sequence of block writes to a bank. Comparison of the amount of data within the collection of data to the volume threshold based upon occurrence of a first threshold number of read operations may be triggered. Comparison of the amount of data within the collection of data to the volume threshold based upon occurrence of a second threshold number of write operations may be triggered. Comparison of the amount of data within the collection of data to the volume threshold based upon occurrence of a third threshold period of time may be triggered. Identifying the first data as having the access characteristics suitable for storing in the asymmetric memory component may include comparing the first data to second data that has already been added to the collection of data and identifying the first data as having content relating to other content appearing in the second data that has already been added to the collection of data. Identifying the first data as having the access characteristics suitable for storing in the asymmetric memory component may include identifying a data structure for the first data, comparing the data structure to second data that has already been added to the collection of data and identifying the first data as being part of a same data structure as the second data that has already been added to the collection of data.

DETAILED DESCRIPTION

Figure 1:
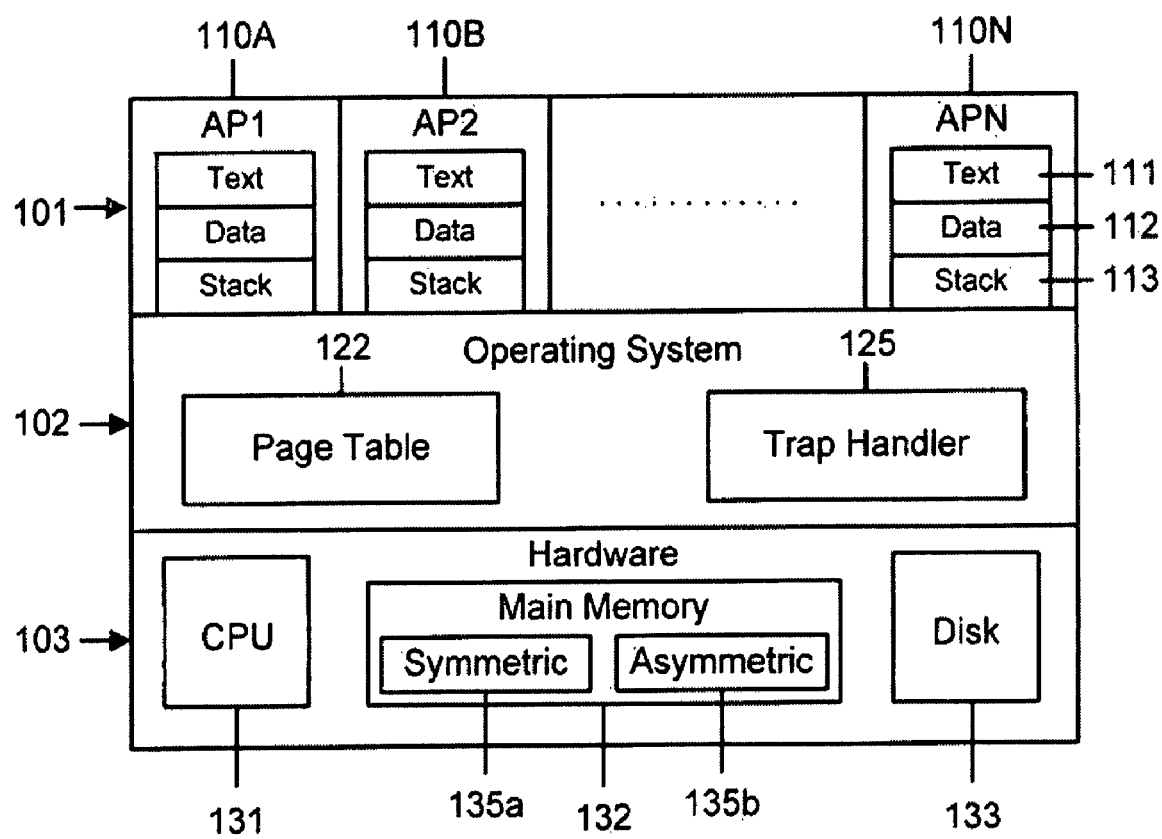
FIG. 1 illustrates an example of a first layer model of a computing system.

The detailed description is divided into four sections. Section A provides a brief description of method and mechanisms. Section B provides a description of the hardware, software, and system context. Section C provides a description of read movement, write movement, and integration. Section D provides a discussion of operations performed and additional configurations.

A. Brief Description of Method/Mechanism

Computer systems may be built using a hybrid memory system that includes symmetric and asymmetric memory components. More precisely, an application on a computer system interfaces with a main memory system that includes symmetric memory components and asymmetric memory components. For example, a search application may load a portion of a search index to asymmetric memory and perform search index analysis using symmetric memory. One type of symmetric memory component includes Dynamic Random Access Memory (DRAM). Among other aspects, symmetric memory is volatile memory and includes memory that performs read operations in a time comparable to a time required to perform write operations. In addition, both read and write operations may be performed in a random access manner where a granular amount of data may be requested or written.

In contrast, asymmetric memory is non-volatile memory and includes memory that supports random access read operations, but does not support random access write operations. Rather, write operations to an asymmetric memory component require a block of data to be written. As a result, write operations to some types of asymmetric memory can take an order to magnitude longer than read operations. In addition, writing a block of data to an asymmetric memory component creates a disruption region that is defined by the blocks of the asymmetric memory component that cannot be accessed during a block write operation. Examples of asymmetric memory include NOR flash memory.

One example of a hybrid memory system includes main memory with DRAM as the symmetric memory component and NOR flash as the asymmetric memory component. The DRAM components are each configured to enable random access write operations in which an address within a block of the DRAM is written without affecting the availability of other addresses within the DRAM. The NOR flash components are each configured to enable block write operations in which a write to an address within a block of one of the NOR flash affects the availability of other addresses within the block of NOR flash.

Because asymmetric memory behaves in a very particular manner when performing block write operations, a computer system using a hybrid memory system that includes symmetric and asymmetric memory components may manage the asymmetric memory component in a special manner to maximize the storage space available for read-intensive data and minimize the impact of adverse performance issues (e.g., disruption regions) associated with block write operations. For example, the computer system may attempt to load read intensive data to an asymmetric memory component and load write intensive data to a symmetric memory component. However, sometimes data that maps to asymmetric memory component may be updated or be the subject of a write command. The computer system may specially process write commands by redirecting writes instructions into symmetric memory, even when the data (or virtual address associated with a previous instance of data) previously mapped to asymmetric memory.

As a result of moving data to asymmetric memory, and then writing updates to virtual data (or virtual addresses) into the symmetric memory, the computer system operates in a less efficient manner. For example, a physical address in NOR flash may be unused because the update to the content has been loaded to DRAM. Over time, these operations may cause the NOR flash to be used in a less efficient manner because data previously identified as having access characteristics desirable for NOR flash is now being stored in DRAM. Significant portions of a bank in NOR flash may go unused as a result. Similarly, a memory controller that otherwise desires to load write intensive data to DRAM may use the DRAM resources themselves in a less than desirable manner as read-intensive data is stored in DRAM.

Therefore, in one configuration, a memory controller integrates data stored within DRAM and NOR flash. The resultant integrated data is stored within at least one portion of NOR flash. If a memory controller receives a write command to write data to a virtual address associated with a first physical address of NOR flash, a page table is configured to change an association of the virtual address from the association with the first physical address in NOR flash of the main memory to a second physical address in DRAM. The memory controller generates an indication that the first physical address is no longer being used to enable association of the first physical address with another virtual address in a subsequent block write operation. Over time, as a number of these operations are performed, the memory controller generates a collection of content entries with access characteristics suitable for storage in NOR flash.

The memory controller determines whether the collection of content entries collectively occupy a threshold amount of storage or whether a threshold period of time has elapsed since the first data item originally present in NOR flash was associated with a physical address in DRAM. In one example, the memory controller may determine whether the collection of content entries includes enough information to be used in a block write in another example, the memory controller may write the collection of content entries periodically, even if the collection of content entries includes less than a desired amount of content.

In response to determining that the collection of content entries collectively occupy the threshold amount of storage or that the threshold period of time has elapsed, the memory controller loads the collection of content entries to a region of the asymmetric memory component using a block write command.

B. Description of Hardware, Software, and System Context

Referring now to FIG. 1, an example of a first layer model 100 of a computing system is illustrated. The first layer model 100 includes an application (AP) layer 101, an operating system (OS) layer 102, and a hardware (HW) layer 103. The AP layer 100 includes one or more application processes AP1 110A through APN 110N.

Examples of application processes may include a web browsing or hosting program, a word processing program, a search program, a data mining and analytical program, or other type of application configured to execute on the AP layer. Application programs may be stored on a disk and remain in a passive state until a user chooses to execute an application program where it is loaded into memory as an application process.

Although other application processes may be employed, each application process (AP1 110A to APN 110N) loaded into memory may be allocated space in the main memory including a text region 111, a data region 112, and a stack region 113. The text region 111 may include executable instructions associated with the application program. The data region 112 may include data associated with the application. The data may be dynamic and/or static. The stack region 113 may include a state of a function or procedure of the application program and its activation frame.

The hardware layer 103 may include a central processing unit or processor 131, a main memory 132, and a hard disk storage 133. The main memory 132 may include symmetric memory 135$a$ (e.g., DRAM) and asymmetric memory 135$b$ (e.g., NOR flash memory). In one implementation, the non-volatile or flash memory 135$b$ is NOR flash electrically erasable programmable read only memory (EEPROM).

The operating system layer 102 resides between the HW layer 103 and the AP layer 101. The operating system layer 102 may be a modified operating system, such as Microsoft Windows, Linux, or another Unix variant, configured to manage hardware included in the HW layer 103 of the computer system. The operating system may include a flash memory trap handler 125 configured to manage the asymmetric memory 135$b$ in the main memory 132. The flash memory trap handler 125 may be configured to reduce the number of write accesses to the asymmetric memory 135$b$.

Multiple processes may place demands on main memory 132 in a computer system. The operating system may respond to those demands for main memory 132 by managing how physical memory is allocated to a virtual address space of each process executing on the AP layer 101. In some implementations, the operating system may use virtual memory management techniques to efficiently manage available physical memory resources and to indicate to tile application processes that there is more memory capacity available for use over and beyond the physical memory capacity in main memory 132. In these implementations, the operating system 102 maintains a page table 122 to map virtual addresses in application processes to physical addresses in main memory 132. The hard disk storage 133 may be used to provide additional memory capacity for an application process.

Virtual memory management techniques may be configured to estimate the immediate memory needs in a specified application and allocate physical memory responsive to the specified application's needs, as opposed to other memory requirements that can be deferred and allocated to hard disk storage 133. A contiguous addressable range of memory, referred to as a page, may be swapped between physical main memory 132 and hard disk storage 133 as its need for immediate use increases or decreases.

Figure 2:
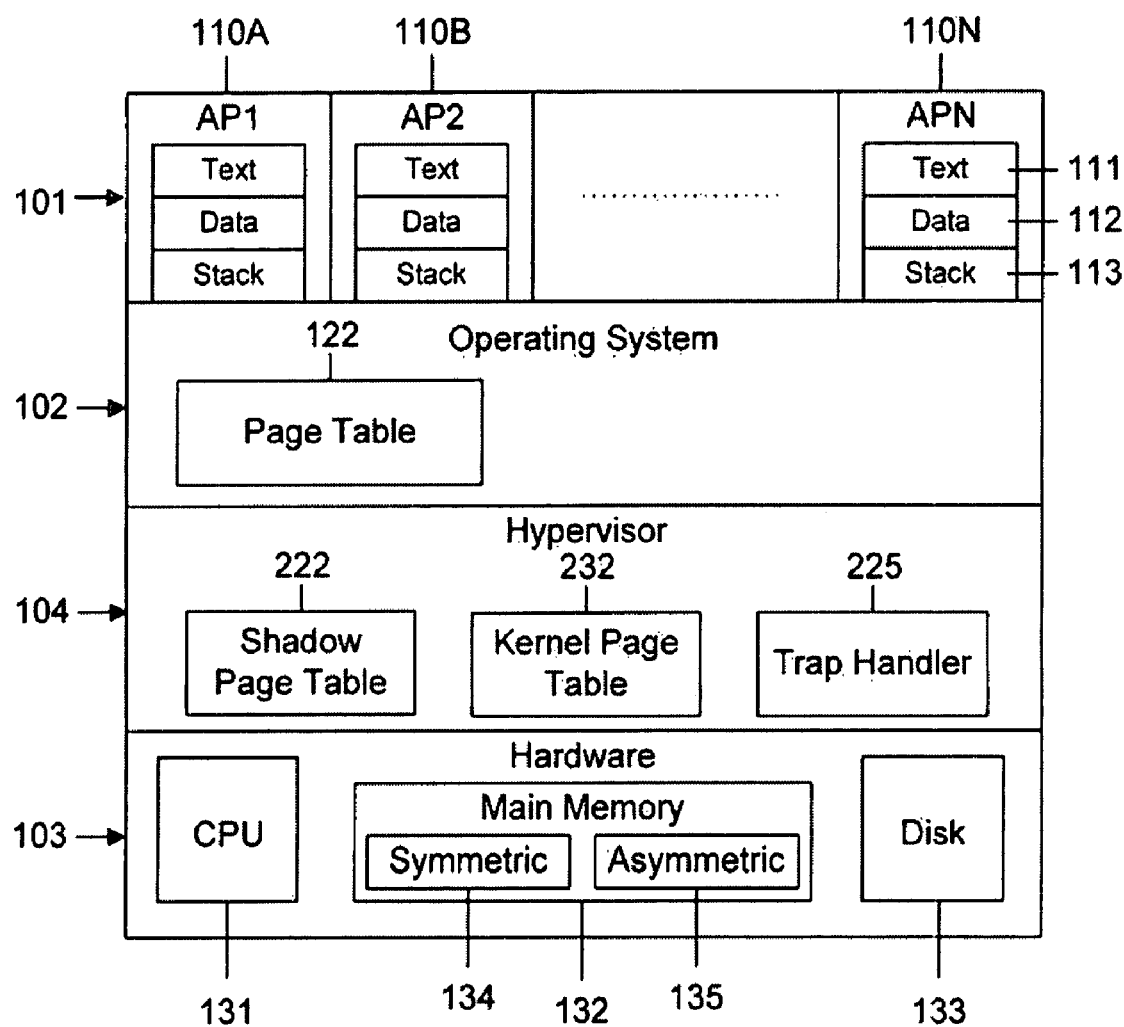
FIG. 2 illustrates an example of a second layer model of a computing system.

Referring now to FIG. 2, an example of a second layer model 200 of a computing system is illustrated. The second layer model 200 includes an application (AP) layer 101, an operating system (OS) layer including one or more host operating systems 102, a hypervisor layer 104, and a hardware (HW) layer 103.

The second layer model 200 differs from the first layer model 100 in that the hypervisor layer 104 is included between the operating system layer 102 and the hardware layer 103, and, instead of the operating system being modified, the hypervisor in the hypervisor layer 104 includes a write access hypervisor trap handler 225 configured to manage the asymmetric memory 135$b$. The write access hypervisor trap handler 225 may be configured to reduce the number of write accesses to the non-volatile memory 135$b$ in the main memory 132.

A hypervisor in a computer system may be a layer of hardware, software, firmware, or combinations thereof operating between the operating system layer and the hardware layer that allows one or more host operating systems (or portions of an operating system) to run, unmodified, on a host computer at the same time.

Each of the one or more host operating systems 102 may maintain one or more page tables 122 to map virtual addresses in application processes to physical addresses in main memory 135. The hypervisor layer 104 may maintain one or more respective shadow page tables 222 for each host operating system to map virtual addresses of the application processes to physical addresses in main memory 135.

Figure 2A:
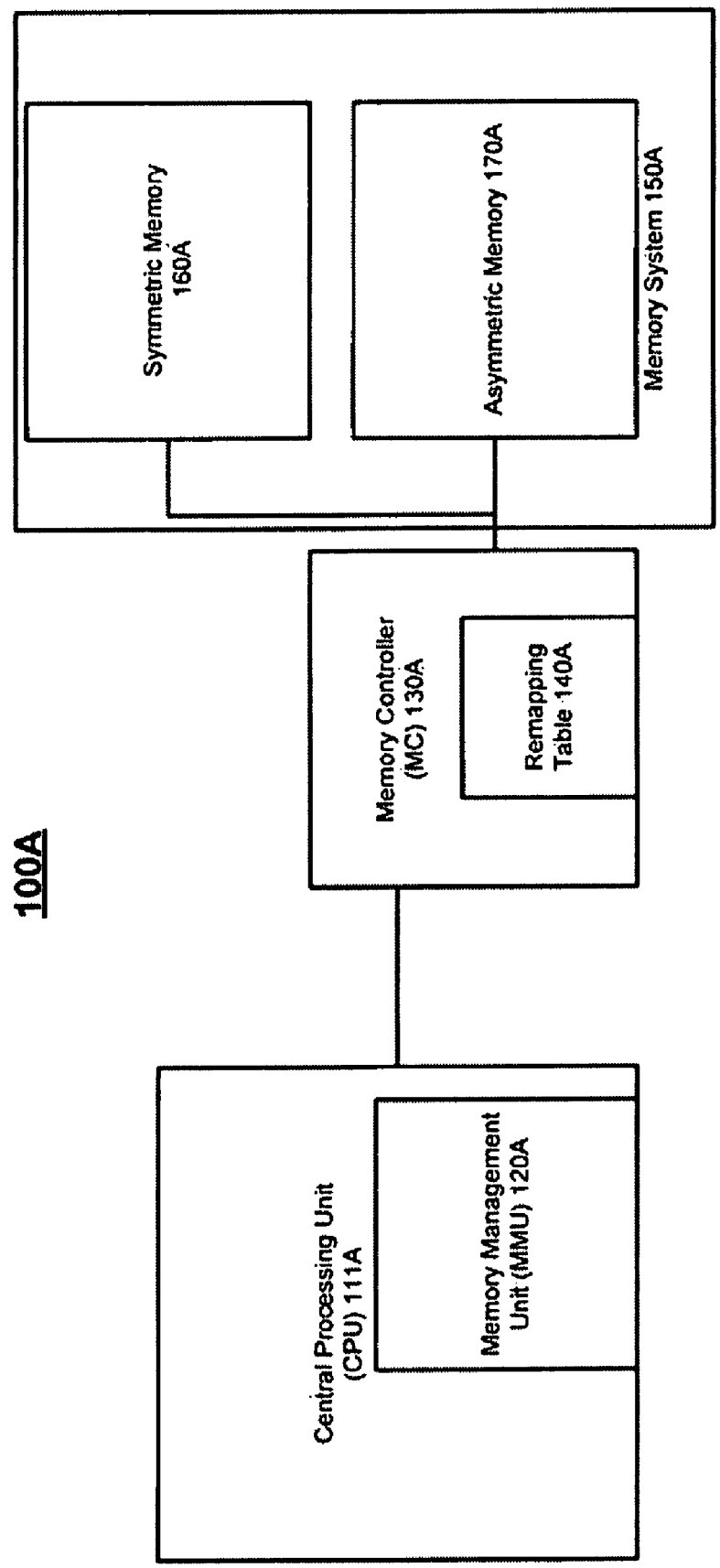
FIG. 2A is a block diagram of a system with a CPU that interfaces with a memory system through a memory controller.

FIG. 2A is a block diagram of a system 100A with a CPU 111A that interfaces with a memory system 150A through a memory controller 130A. More precisely, the memory controller 130A is positioned, oriented, and configured to enable it to be leveraged in processing read and write requests from the memory management unit 120A to the memory system 150A while shielding the CPU 111A from challenges resulting from particular access characteristics associated with asymmetric memory 170A.

The CPU 111A includes logic configured to implement one or more processing operations. Examples of a CPU 111A may include x86-based processors from Intel Inc. and Advanced Micro Devices Inc. (AMD), and/or ARM(™) processors. The CPU 111A may include one or more processor cores.

Generally, each CPU 111A interfaces with an operating system. The operating system, in turn, may interface with one or more applications. These applications may include a search engine, business analytics, data mining, database operations. Each of these applications may be compiled (or interpreted) into different machine-level instructions for execution on the CPU 111A. Although only one CPU 111A is shown, multiple CPUs may be used. Each CPU 111A supports an instruction set with a variety of instructions. These instructions may include, among other operations, register shifts, arithmetic operations, and memory operations. Examples of the memory operations may include random access read and write operations and I/O read and write instructions that can be used to initiate block read and write operations.

As shown, the CPU 111A includes a memory management unit 120A. Generally, the memory management unit 120A is configured to manage a physical address space for the CPU 111A. As the CPU 111A is executing a program, the CPU 111A may request to read data from a particular address and write data to a particular address. More precisely, the memory management unit 120A may be configured to receive a virtual address from the CPU 111A and translate the virtual address into a physical address (i.e., a memory management unit-specified physical address). In the case of a read, the CPU 111A may be configured to consult the memory management unit 120A to obtain the physical address associated with the virtual address specified by the CPU 111A. The memory management unit 120A (or some other entity) in the CPU 111A is instructed to retrieve data from the MMU-specified physical address. Other systems (e.g., the memory controller 130) may, in turn, process the memory management unit-specified physical address as an additional type of virtual address. In another configuration where a translation element of an MMU is separated out from the portion of the CPU that is responsible for interacting with the memory subsystem, the MMU may be configured to obtain the physical address associated with the virtual address. The MMU (or another entity in the CPU) then may be instructed to retrieve data from the MMU-specified physical address.

The memory controller 130A is logically oriented as an intermediary system to enable the CPU 111A to interface with a memory system 150A. More precisely, the memory controller 130A is a system configured to receive read and write instructions with a memory management unit-specified physical address from the memory management unit 120, lookup a memory controller-specified physical address associated with the memory management unit-specified physical address, and perform the requested read and/or write instruction on the block(s) of physical memory corresponding to the memory controller-specified physical address.

The memory controller 130A includes logic (hardware and/or software) configured to manage the placement of and movement of data within a memory system 150A. The memory controller 130A maybe configured to dynamically process instructions based on a determination of whether the data and/or address is associated with symmetric memory or asymmetric memory. Similarly, the memory controller 130A may be configured to process read instructions in a first way, and process write instructions in a second way. For example, the memory controller 130A may be configured to permit read operations from the memory management unit that specify a particular address to leverage or otherwise operate on a first address within asymmetric memory, while concurrently processing write operations from the memory management unit that specify a particular address to leverage or otherwise operate on a second address within symmetric memory.

The memory controller 130A includes a physical interface to the memory system 150A. The physical interface is configured to automatically exchange physical address information as the memory controller 130A interfaces with the memory system 150A.

The memory controller 130A includes a remapping table 140A that stores an association between a memory management unit-specified physical address and a memory controller-specified physical address. The remapping table 140A may associate multiple memory controller-specified physical addresses with a memory management unit-specified physical address. For example, the remapping table 140A may be configured to indicate that writes to the disruption region should be directed to a "new" physical address range for the memory management unit, while reads from the disruption region should be directed to the "old" physical address range. Moreover, the remapping table 140A may indicate that a particular memory management unit-specified physical address is associated with a disruption region. For example, high-order address bits and some low-order bits in the MMU-supplied physical address may be analyzed to indicate which bank is being used. Alternatively, the memory controller may include logic (or include another column in a software table) that identifies the bank being used. Configuring the memory controller to have a bank identifier readily available may be used to reduce the processing burden of identifying a bank, for example, when performing write operations. The memory system 150A may include symmetric memory 160A and asymmetric memory 170A. The memory system 150A may be packaged as one or more DIMMs (Dual Inline Memory Modules) and configured to support DIMM protocols, signaling, interconnects, and physical interfaces.

The symmetric memory 160A includes one or more memory systems where read characteristics have similar properties to the write characteristics. Examples of symmetric memory include DRAM, and other random access memory technologies.

The asymmetric memory 170A includes one or more memory systems where read characteristics and write characteristics are dissimilar. For example, some types of asymmetric memory have write latencies that are orders of magnitude greater than the read latencies. Examples of asymmetric memory may include NOR flash. With some types of asymmetric memory, an interface is used to (among other things) require an entire region of content to be rendered inaccessible to read requests whenever any constituent block of the region is written, for example, using an I/O block write, instead of a smaller, random access write to the specific update location.

In configurations where the memory system 150A resides in DIMM packaging, the DIMM may be configured to dynamically process read and write instructions. For example, in a read mode, one or more DIMMs may be configured to receive instructions to access content residing at a particular physical address, and provide requested content to the processor through the memory controller. Generally, in a write mode, the DIMM is configured to receive data to be written with a physical address. Depending on whether the physical address represents flash or DRAM, the data may be written in a random access manner (e.g., a word or byte) or in a block (e.g., a 4 Megabyte or a 4 kilobyte block). In one configuration, the DIMM is entirely made up of one type of memory (e.g., DRAM or NOR flash). In another implementation, the DIMM includes a hybrid of both DRAM and flash and relics on an internal or external memory controller to perform the different operations required to implement a hybrid memory system. And, although one or more configurations were described where a hybrid and/or dedicated configuration was used, a different configuration may be used.

C. Description of Read Movement, Write Movement, and Integration

FIGS. 1, 2, and 2A illustrate different components in a server system that may be configured to interface with and control aspects of a memory system with symmetric and asymmetric components. In one configuration, a hybrid (e.g., symmetric/asymmetric volatile/non-volatile, DRAM/Flash, etc.) main memory system may be used by modifying application programs to decide which portions of its text (e.g., code) and data areas to map to symmetric regions and asymmetric regions in the main memory. The mapping by the application program may be modified to reflect characteristics of different types of memory. For example, a memory controller may be configured to selectively load data to memory in response to a relatively slow latency seen with a type of flash memory region accesses, as well as other properties of the type of flash memory device, such as the limited write lifetime, limited number of reads between writes, and the relatively longer latency for erase and write operations. Modifying application programs to support a hybrid main memory including DRAM memory and flash memory may pose one or more of the following or other challenges.

For example, restructuring application programs to be aware of and interface with a hybrid memory system may be easier to implement if the modification to the structure of the application is limited. In this example, application programs that rely on memory-mapped input/output ("I/O") functionality, similar to that provided by a memory map ("mmap") system call, may reduce the degree of restructuring that is required to support a hybrid main memory. Existing parameters and arguments supplied with a mmap call may be used to make a determination about whether or not a certain I/O object should reside in the asymmetric memory region. However, applications that are associated with a more dynamic use of memory resources, for example, to implement an application-specific cache for I/O objects, may require a more extensive revision to the memory commands in order to support a hybrid main memory. In one example, a program associated with a more dynamic use of memory resources may be specifically configured to operate with certain symmetric (e.g., DRAM) memory characteristics, and thus, may have read/write access behaviors that are not well suited to asymmetric memory.

In some implementations, unmodified application programs (e.g., a program encoded in binary form) may be used with a hybrid DRAM/flash memory subsystem. In these implementations, the portion of the application code and data that are accessed in a read-only fashion and/or operations that are relatively tolerant of increased access latency, may be migrated over time in an adaptive fashion from DRAM memory regions into the flash memory regions in the main memory.

Figure 3A:
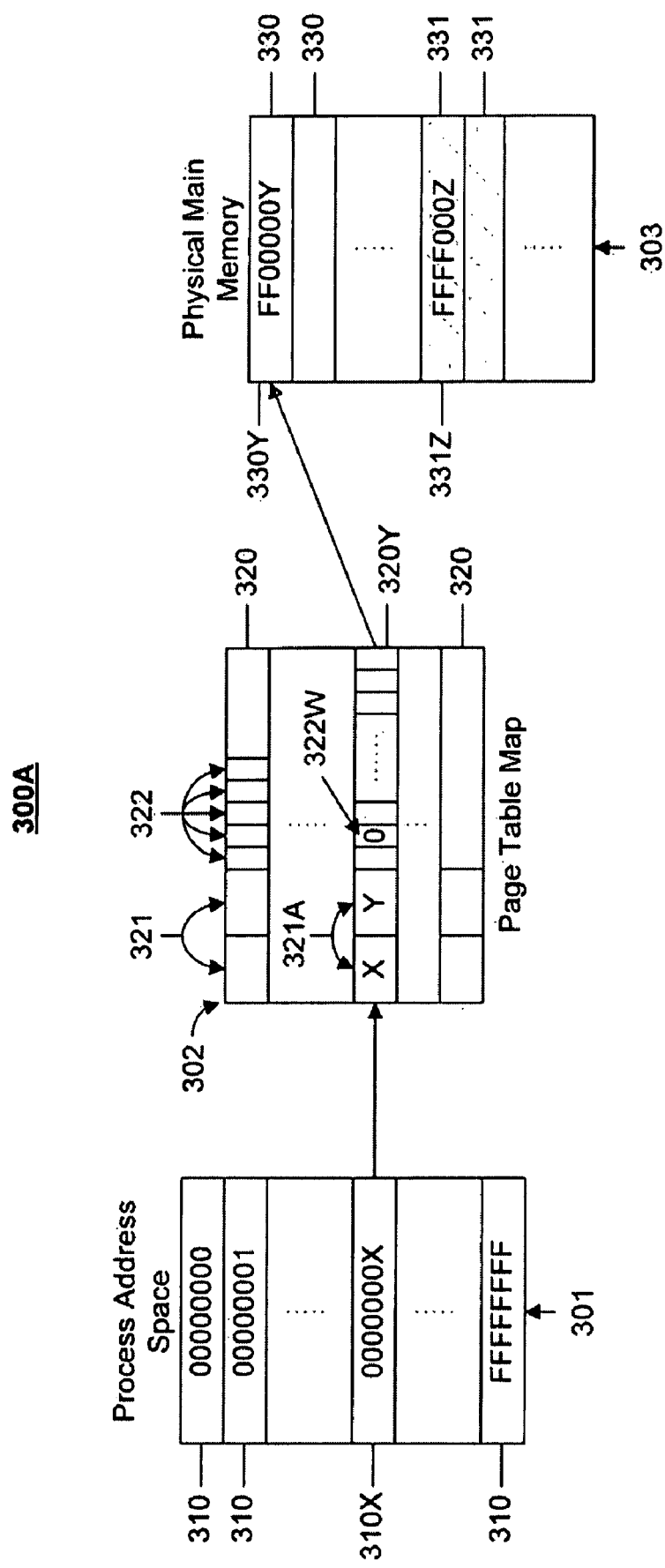
FIGS. 3A-3B are diagrams illustrating an example of mapping a virtual address space of an application running on a processor into a physical address space of a hybrid main memory using a page table map.

Referring now to FIG. 3A, a virtual address space or processor address space 301 may be mapped into a physical hybrid main memory 303 by a page table map 302. That is, a plurality of pages 310 associated with virtual addresses may be mapped to physical addresses of a plurality of physical pages in the hybrid main memory 303. The page table map 302 may include one or more page table entries (PTE) or slots (320A-320N) to map the virtual page address to the physical page address. The page table map 302 may be in a structure called the page table and may be maintained by the operating system. Page table map and page table may be referenced interchangeably.

Figure 5A:
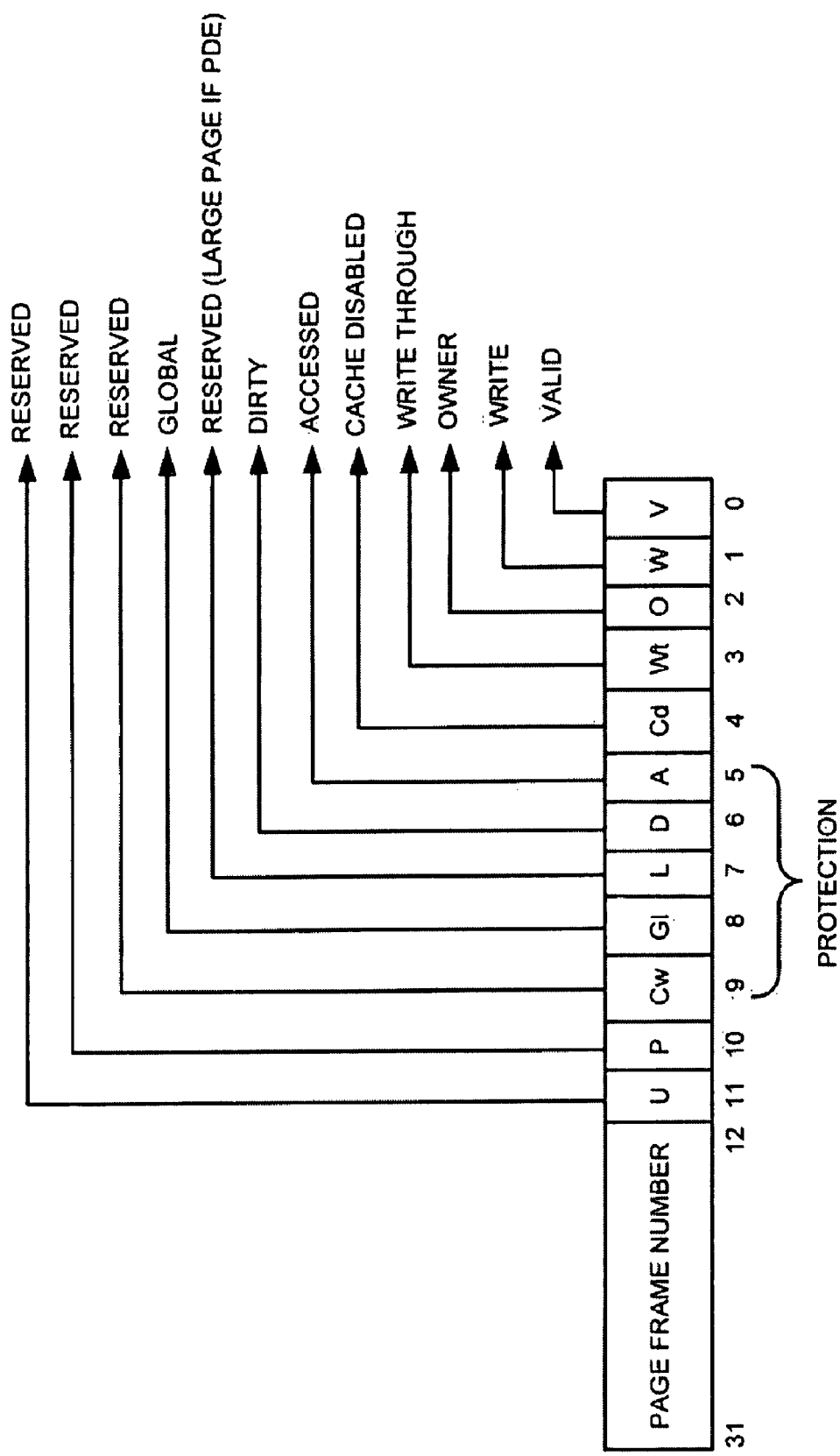
FIG. 5A is a diagram illustrating the bits and bit fields in a page table entry in a page table, which is illustrated as having 32 bits.

Each slot 320 in the page table map 302 may include a page frame number (PFN) 321 and one or more protection bits 322, one of which may be a write protection bit 322W that may be used to provide/signal page protection. The write protection bit controls whether CPU-initiated writes are allowed against virtual page locations corresponding to the page table entry. When set, writes are disallowed, resulting in an operating system or hypervisor level trap that enables software to exercise control over whether and how the write operation is preformed. FIG. 5A shows other bits and bit fields that may be included in each slot 320 of an exemplary thirty-two bit wide PTE of page table map 302. In a 32-bit wide addressing scheme, bits 31-12 identify the page frame number. Bit 11 is reserved and writable on multiprocessor systems. Bits 10 and 9 are reserved. Bit 8 is a global bit, and bit 7 is used to identify whether the page is a large page. Bit 6 is a dirty bit identifier indicating whether the page has been written to. Bit 5 indicates whether the page has been read. Bit 4 indicates that the cache has been disabled, and bit 3 indicates that write through is supported to disable caching of writes to this page so that changes are immediately flushed to disk. Bit 2 indicates whether the user mode can access the page or whether the page is limited to kernel mode access. Bit 1 indicates whether the page is read/write capable or only readable, controlling whether the page is writable. Bit 0 indicates whether the translation maps to a page in physical memory.

Figure 5B:
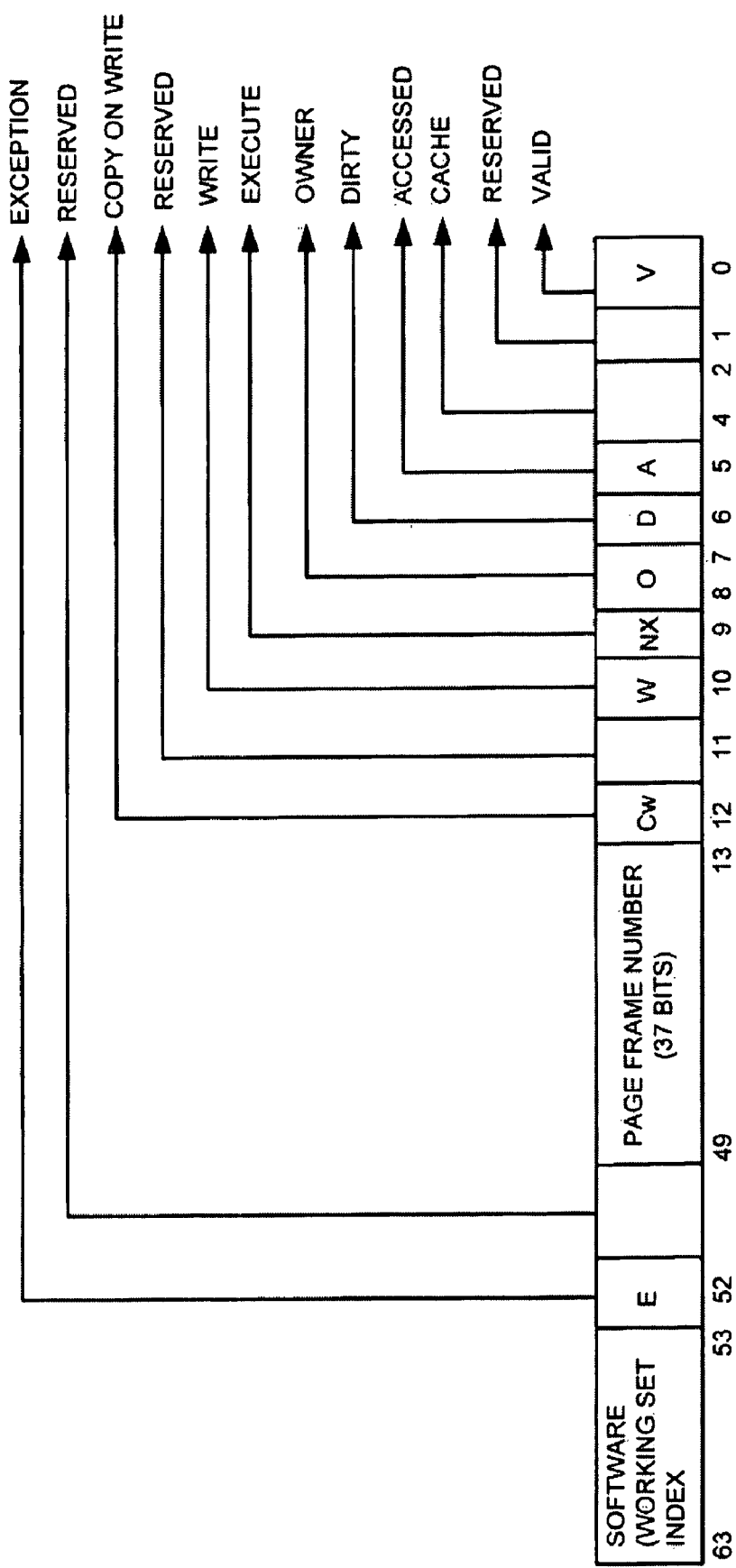
FIG. 5B is a diagram illustrating the bits and bit fields in a sixty-four bit slot or page table entry in a page table.

FIG. 5B is a diagram illustrating the bits and bit fields in a sixty-four bit slot or page table entry in a page table. In a sixty four bit wide addressing scheme, bits 63-53 are software representing a working set index. Bit 52 is used to indicate exceptions, and bits 51 and 50 are reserved. Bits 49-13 represent the page frame number. Bit 12 is used to indicate a copy on writes, and bit 11 is reserved. Bit 10 is used to indicate whether writes are allowed, and bit 9 is used to indicate the execute bit. Bits 8 and 7 indicate owner parameters specifying whether the user mode can access the page or whether the page is limited to kernel mode access. Bit 6 is a dirty bit indicating whether the page has been written to. Bit 5 is an access bit indicating whether the page has been read. Bits 4-2 indicate the cache parameters. Bit 1 is reserved and bit 0 indicates whether the page is valid or not.

In one example, the write protection bit may be set to logical zero to indicate that the associated page is read-only. In another example, the write protection bit may be set to logical one to indicate that the associated page is read-only. In either example, the write protection bit may be changed to indicate that the associated page is read accessible only. Without the write protection bit being appropriately set to protect a page from write access, the page may be both read and write accessible.

In translating a virtual address to a physical address in physical memory, additional translation hierarchy may be used in addition to the page table map 302 to provide additional addressable memory. The hierarchy may include page directories to point to page tables, page directory pointer tables to point to page directories, and a page map level table to point to the page directory pointer tables. However, the page table map 302 may be used to support the hybrid main memory at the lowest level of the address translation hierarchy.

In one initial default configuration, an application may be assigned by the page table map 302 to use DRAM memory pages 330 in the hybrid main memory 303. For example, a virtual page X of addressable memory 310X indexes into, relates to, or points to a slot 320Y in the page table map 302 to translate the virtual address into a physical address that points to a DRAM memory page Y 330Y in one of the DRAM memory regions of the physical hybrid main memory 303. In this example, the write protection bit 322W of the slot 320Y in the page table map 302 is set to zero to indicate that the DRAM memory page 330Y in the physical hybrid main memory 303 is both read and write accessible.

Figure 3B:
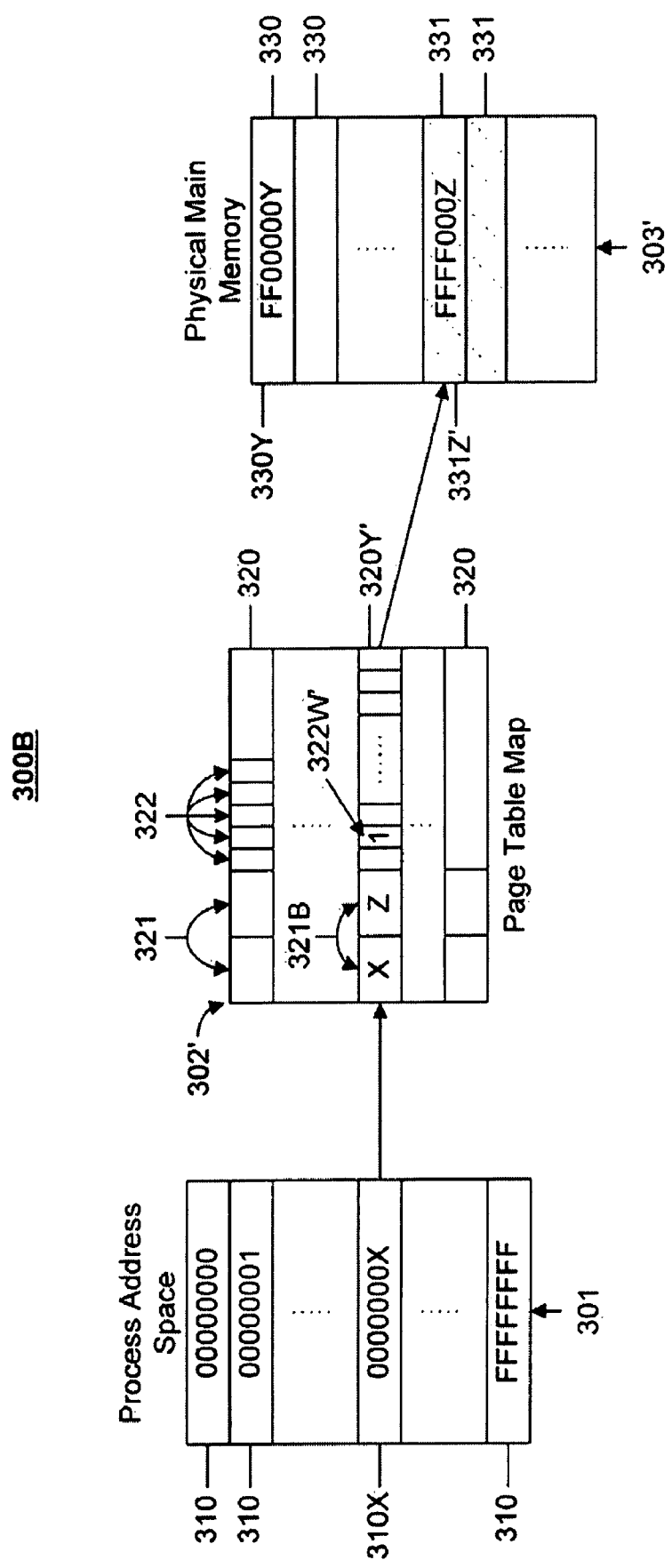

Referring now to FIG. 3B, the information in the DRAM memory page Y 330Y has been copied into the flash memory page Z 331Z', for example. In this example, the page frame number in slot 320Y' in the page table map 302' has been updated to page frame number 321B to translate the virtual page address 310X to point to the flash memory page Z 331Z'. The write protection bit 322W has been changed to the write protection bit 322W' to signal that the access through the virtual page address X 310X to the flash memory page Z 331Z' is a read access only with write accesses being trapped. Modification of the write protection bit may disallow random write access to the flash memory page Z 331Z'. After migrating the information to flash memory, the DRAM memory page Y 330Y is freed-up so that it may be used to store other information.

In implementations in which write access to the flash memory page Z is disallowed, if an application attempts to write using a store instruction to the protected flash memory page, the application is interrupted and a protection handler (e.g., the trap handler) in the operating system is given control to handle the write operation to the protected flash memory page Z 331Z'. The attempt to write to the protected page may be referred to as a general protection fault or a segmentation violation that is trapped by the operating system.

Figure 4:
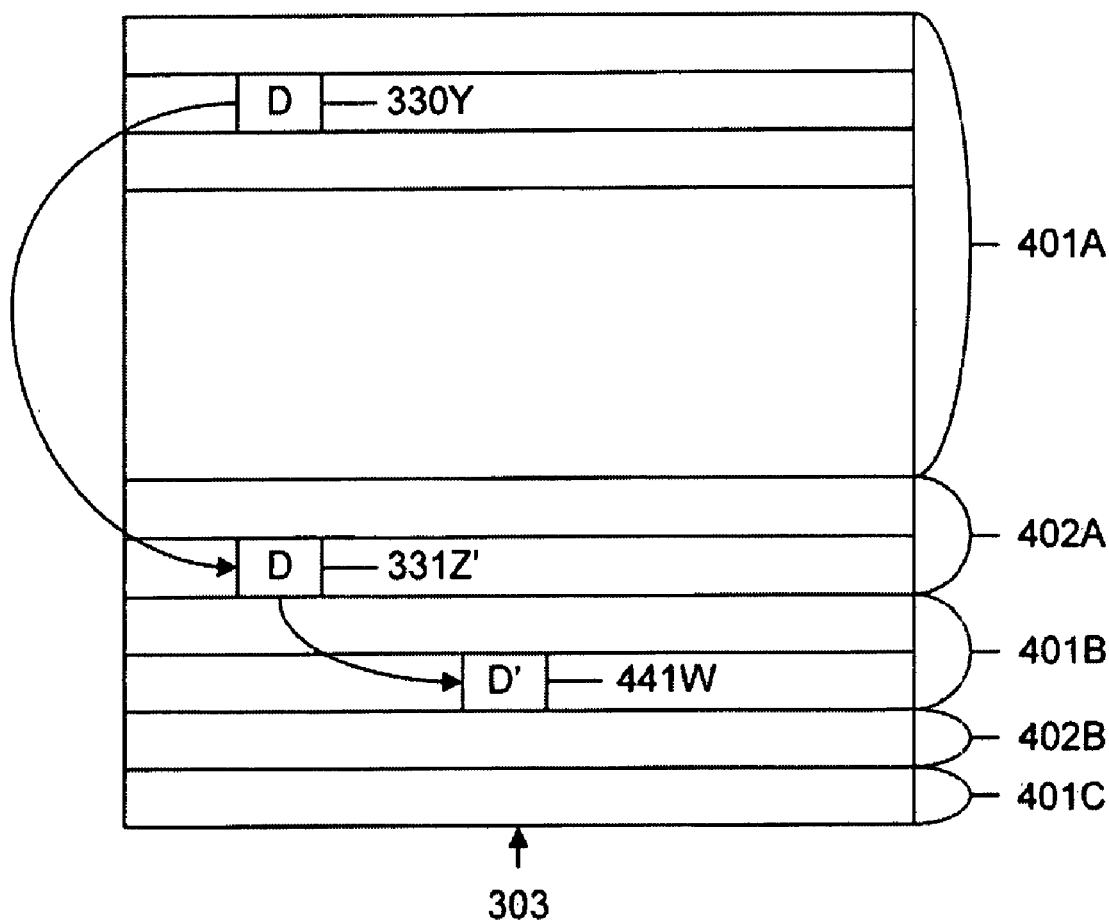
FIG. 4 is a diagram of main memory illustrating an example of migration of information between symmetric memory regions and asymmetric memory regions.

Referring to FIG. 4, consider, for example, a hybrid main memory 303 including one or more DRAM memory regions 401A-401C and one or more flash memory regions 402A-402B. A page 330Y of application code and/or data D may be stored in the DRAM memory region 401A of main memory 303 by an application program. Data may be moved into the flash memory regions directly from DRAM or from another source. In response, the application code and/or data D stored in page 330Y may be copied and written into a page 331Z' in the flash memory region 402A. The page 330Y in the DRAM memory region 401A may be thereafter freed and used for other purposes that require write access or that are less tolerant of access latency increases (e.g., the physical address for page 330Y may be put on a free list maintained by the operating system to indicate that it is unallocated to any process).

Because write access times into asymmetric memory devices may be significantly longer than read access times, a modified operating system may be configured to trap attempted write accesses into the asymmetric memory. The trap may be configured by setting the write protection bit in the page table entry to permit only read accesses. An attempt by the processor to write to a location on the corresponding page may trigger a protection fault. A protection fault handler or trap handler 125 can either complete the write (at the slower speed), or decide to copy back the page of data into a DRAM memory page and update it with the write access into the DRAM memory page. Such a DRAM memory page may also be marked, for example, in the page table, as being non-migratable into a flash memory page for a period of time so as to complete the update of the information by writing into the DRAM memory page. For example, the memory controller may create an access collections table, or modify a memory table to include parameters to track access to data in memory. Reading a virtual address may increment a read counter while writing a virtual address may increment a write counter or set a warning flag indicating that a write to the virtual address has been recently performed. The access collections table may be modified to include a time parameter indicating that the page should not be migrated for (1) a specified duration or monitoring cycle, or (2) until a threshold degree of reads are performed before another write operation is performed. The access collections table may track the amount of data written to storage and the elapsed time since the data was migrated to the asymmetric memory component. The amount of data written may be used in prioritizing which data is migrated to the asymmetric memory component so that larger amounts of data are favored as being computationally more efficient. The elapsed time since the data was migrated may be used to as an indicator of whether the data is likely to be subject to future write operations. Referring now to FIG. 4, if the application attempts to write to the protected flash memory page 331Z', a new DRAM memory page W 441W may be allocated in the main memory 303. The information content D maybe copied into the DRAM memory page W 441W. In the slot of the page table map, the PFN is updated to indicate the DRAM memory page W 441W and the write protection bit 322W' is changed back to protection bit 322W such that the page is writable so that the application may write new information into the DRAM memory page W 441W. The information D is thereafter updated to information D' in the DRAM memory page W 441W.

Figure 6:
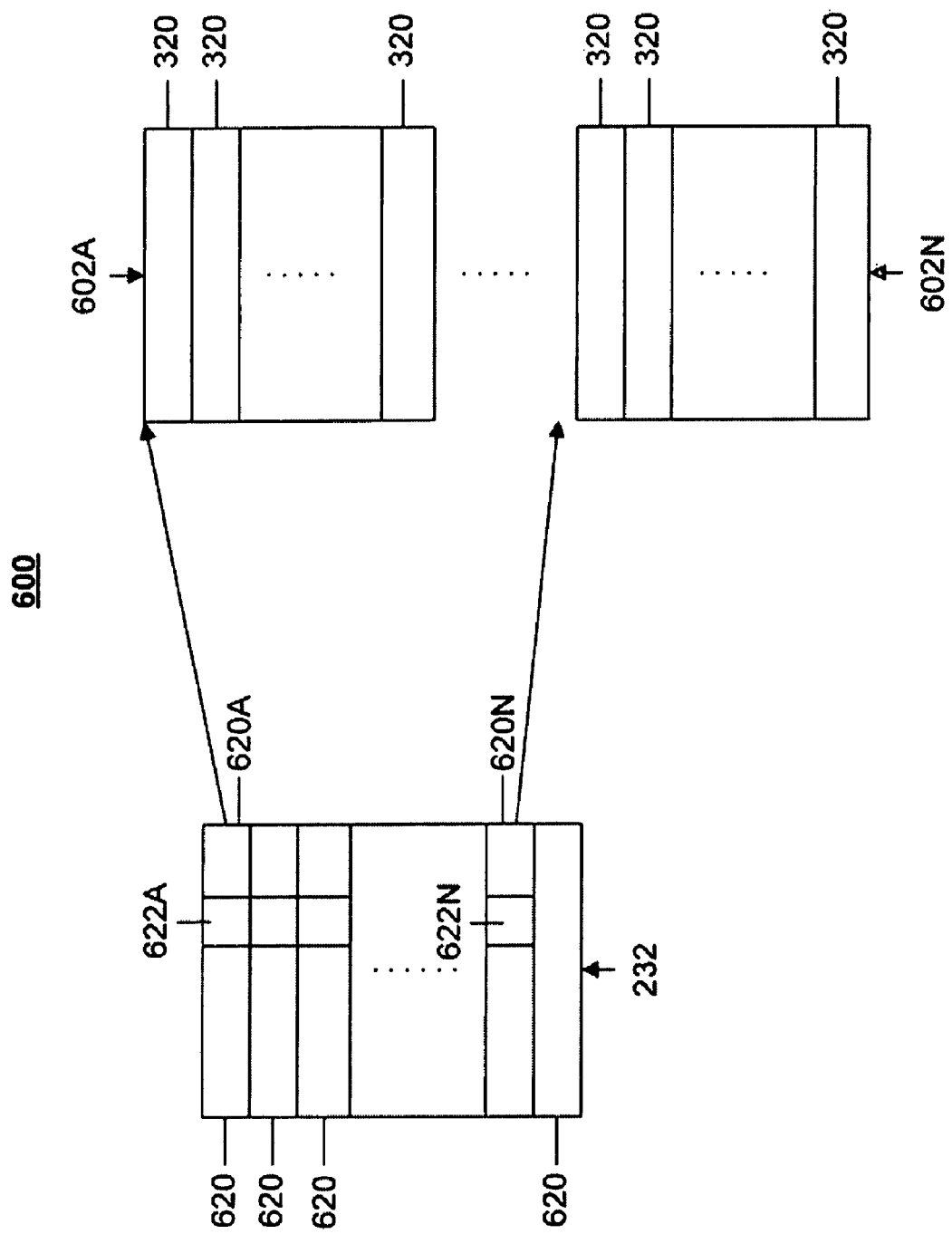
FIG. 6 illustrates an example of a multilevel mapping of virtual address space of an application running on a processor into a physical address space of a hybrid main memory using a shadow page table.

FIG. 6 illustrates a multilevel mapping 600 of virtual address space of an application running on a processor into a physical address space of a hybrid main memory by means of a shadow page table map. More precisely, and also referring back to FIG. 2, the hypervisor 104 maintains a shadow page table 222 to that of the page table 122 maintained by the operating systems in order to map virtual addresses of applications running under the control of one or more host operating systems to physical addresses in main memory 135. The shadow page table 222 in the hypervisor 104 is similar to the page table 122 maintained by the one or more host operating systems 102. However, in multilevel mapping 600, the hypervisor 104 alters the bits in the shadow page table 222.

The hypervisor supports executing one or more copies of a host operating system to provide the illusion of enabling multiple virtual machines on one physical machine. The hypervisor manages the allocation of raw hardware resources, including main memory, amongst the one or more virtual machines.

The shadow page table 222 in the hypervisor 104 is similarly managed as the page table 303 discussed previously to migrate information in DRAM memory regions into flash memory regions of a main memory. That is, the shadow page table 222 has its page table entries updated as information in DRAM memory pages are copied into flash memory pages and vice-versa. The hypervisor 104 also changes the write protection bits in the slots of the shadow page table 222 to protect the corresponding mapped flash memory pages from being written.

In one configuration, the hypervisor trap 225 works in conjunction with the kernel page table (KPT) 232 maintained by the hypervisor 104. In this configuration, the kernel page table 232 has one or more slots or page table entries 620 that point to the physical address for each process page table 602 of each respective operating system of each respective virtual machine maintained by the hypervisor. For example, entry 620A points to the process page table 602A for a first operating system of a first virtual machine. Entry 620N points to the process page table 602N of the Nth operating system of the Nth virtual machine. Each process page table 602 has page table entries 320 to map virtual addresses to physical addresses. For an operating system to allocate or modify a process page table 602, it ends up passing control to the hypervisor via with the kernel page table 232. Before the operating system can allocate or modify a process page table 602, the hypervisor trap 225 traps the instruction that wants to update information located in certain locations of the page table.

Upon initial allocation, the hypervisor allocates a process page table to a given operating system but prevents it from being written to by the operating system. This prevents the operating system from changing the bits in the process page table. In this configuration, this behavior is achieved as follows. Each slot or entry 620N in the kernel page table 232 includes a protection bit 622N to protect its associated process page table 602N from being written.

In one configuration, the DRAM memory resources freed up because of the migration of information from a page in a DRAM memory region to a page in the flash memory region of the hybrid main memory may be used by the hypervisor to support the memory requirements of other virtual machines. In a second configuration, these freed resources may be made available for use by the virtual machine from which they were recovered by dynamically expanding the memory allocation initially configured for that machine.

Figure 7:
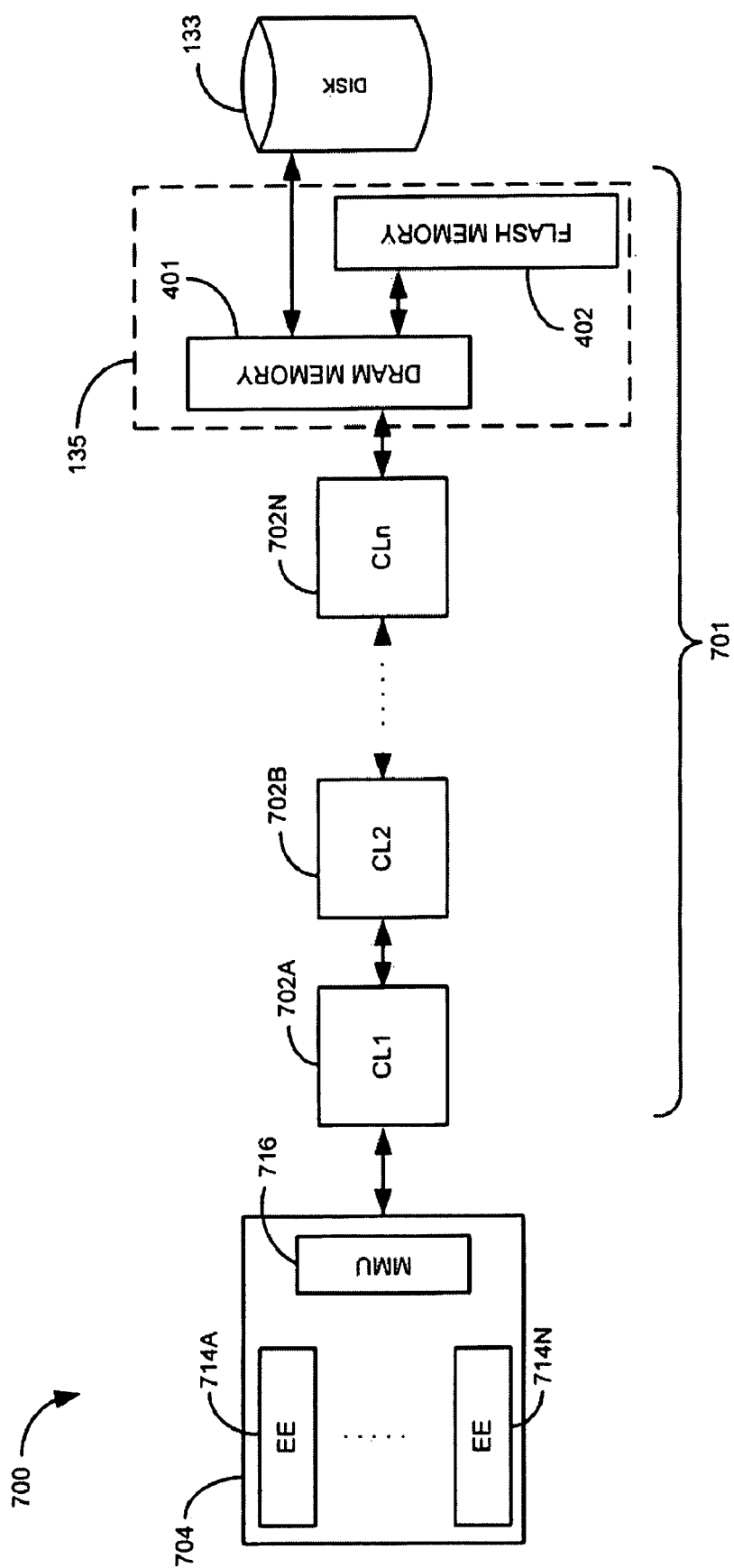
FIG. 7 illustrates a virtual memory hierarchy for a computer system between a processor core and hard disk storage.

After a threshold of writes have been collected in the access collections table, or a threshold of time has passed, the information being collected in DRAM memory may be integrated back into NOR flash memory. The process for performing this migration may include using the same controlling logic that was used during the original move of information from DRAM into NOR. More precisely, and referring now to FIG. 7, a virtual memory hierarchy 701 for a computer system 700 is illustrated between a processor core 704 and hard disk storage 133. The processor core 704 may be a multiprocessor core including one or more execution engines 714A-714N. The memory hierarchy 701 may include one or more levels of cache memory 702A-702N and a hybrid main memory 135 with DRAM memory regions 401 and flash memory regions 402. Additionally, a computer system may have more than one processor core, each associated with its own levels of cache memory 702A-702N and possibly its own hybrid main memory 135. In one configuration, the memory closest or nearest to the processor (the fastest memory) has the fastest access times while the memory furthest from the processor (the slower memory) has slower access times.

A memory management unit 716, integrated with or separate from the processor core 704, working in cooperation with the operating system may bring forward pages of information associated with addresses in an application's virtual address space into main memory 135 to allow the execution engines to actively process this information. That is, the memory management unit 716 may page information by reading pages of information from the hard disk storage 133 into the main memory 135. Additionally, portions of the information may be brought forward into one or more levels of the cache memory 702A-702N. A valid bit in each slot in the page table corresponding to the page of memory is set to indicate a valid page in memory. If the page of information is no longer needed in main memory, the valid bit is cleared so that page of memory may be reused. If the page of information was updated, indicated by the setting of a dirty bit, the page of information may be written into the hard disk storage 133 by the operating system.

As the hard disk storage 133 may maintain a copy of each page in the memory hierarchy 701, the computer system may be configured so that pages of information in the memory hierarchy 701 are not pushed back down to slower memory in the memory hierarchy. However in implementations having a hybrid memory 135, pages of information may be pushed down the memory hierarchy 701 from DRAM memory regions 401 in the main memory, which may be a faster memory type, into flash memory regions 402 in the main memory, which may be a slower memory type while retaining its direct addressability in memory. Moreover, the hybrid main memory 135 has two different types of memory pools that are managed by the operating system or hypervisor, flash type memory regions and DRAM type memory regions. The DRAM type memory regions may be readily read-writeable. In contrast, the flash type memory regions may be readily readable but it is desirous to write infrequently into flash memory due to a slower write access time and the possibility of flash memory wear out.

D. Discussion of Operations Performed and Additional Configurations

Figure 8:
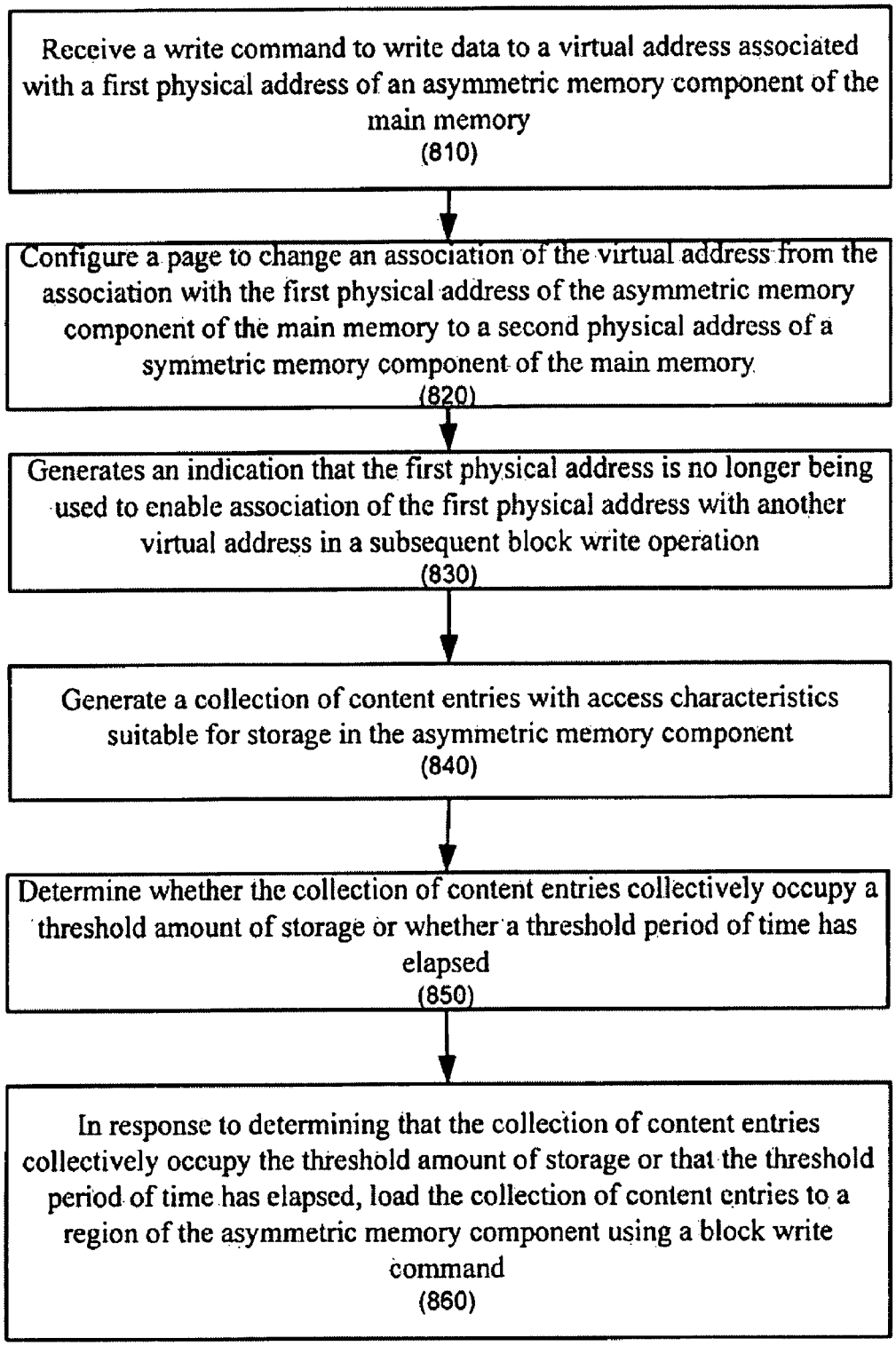
FIG. 8 is a flow of a process by which a memory controller integrates data stored within symmetric and asymmetric memory components of main memory.

FIG. 8 is a flow chart 800 of a process by which a memory controller integrates data stored within symmetric and asymmetric memory components of main memory. Although the operations are described as generally being performed by a memory controller, the operations may be performed on a memory controller that resides in the operating system, a hypervisor layer, or works in association with specialized hardware.

Initially, the memory controller receives a write command to write data to a virtual address associated with a first physical address of an asymmetric memory component of the main memory (810). The memory controller may look up the virtual address in a page table, and based on the lookup, determine that the virtual address maps to the asymmetric memory component. The memory controller configures a page to change an association of the virtual address from the association with the first physical address of the asymmetric memory component of the main memory to a second physical address of a symmetric memory component of the main memory (820). The memory controller loads the data to symmetric memory, and modifies the page table to associate the virtual address with a symmetric memory component physical address.

The memory controller generates an indication that the first physical address is no longer being used to enable association of the first physical address with another virtual address in a subsequent block write operation (830). In one configuration, the memory controller collects information related to movement of content from asymmetric memory components to symmetric memory components. Depending on the degree of granularity permitted by the page table and/or the asymmetric memory component, the memory controller may indicate which pages within the asymmetric memory component are no longer being used and/or the utilization for a region within the asymmetric memory component. The information may include physical addresses for the locations no longer being used in the asymmetric memory component.

The memory controller generates a collection of content entries with access characteristics suitable for storage in the asymmetric memory component (840). A memory controller that identifies the data that has been moved to the symmetric memory component may track how the data in the symmetric memory component continues to be used. Those content entries whose access characteristics are read intensive and feature minimal use of writes are added to a collection of content entries.

The memory controller determines whether the collection of content entries collectively occupy a threshold amount of storage or whether a threshold period of time has elapsed (850). In one configuration, writing to asymmetric memory is associated with a certain performance cost. A first type of performance cost is that a disruption region of asymmetric memory is unavailable for the duration of the write. Thus, reads to the disruption region may be interrupted during the write operation. In another sense, an internal bus is occupied as data is transferred from a first component to a second component. The performance cost may vary with the amount of data being written and the amount of data being taken offline during the write. Thus, a sequential write of a page (e.g., 4 k) to a 2 GB bank that only stores 4 MB is less disruptive than overwriting the entire bank that is nearly full with a new bank's worth of content.

In response to determining that the collection of content entries collectively occupy the threshold amount of storage or that the threshold period of time has elapsed, the memory controller loads the collection of content entries to a region of the asymmetric memory component using a block write command (860). In a configuration where the content entries are stored in DRAM, the collection of content entries may be loaded from DRAM to NOR flash. In another configuration where the content entries include content stored in DRAM, and also include content entries stored in asymmetric memory in a less than desirable manner, the content entries maybe loaded from DRAM and first portions of the asymmetric memory component to second portions of the asymmetric memory component.

Figure 9:
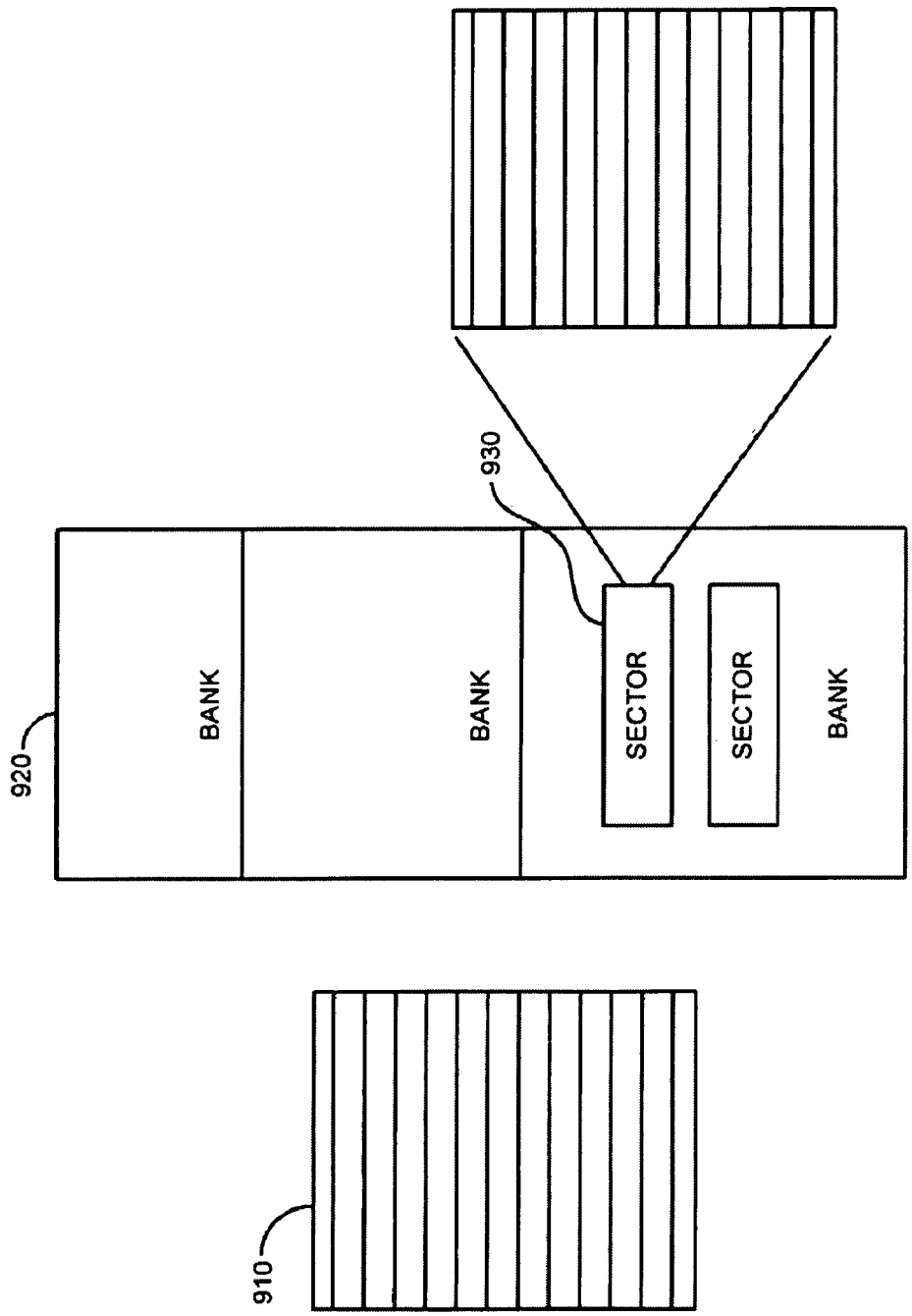
FIG. 9 is a block diagram of a configuration for a hybrid memory system within a computer system that includes an asymmetric memory component and a symmetric memory component.

FIG. 9 is a block diagram 900 of a configuration for a hybrid memory system for a computer system that includes an asymmetric memory component and a symmetric memory component. In particular, block diagram 900 illustrates how a configuration of memory may be organized into a symmetric memory component 910 and an asymmetric memory component 920.

The symmetric memory component 910 includes a memory system, such as DRAM, where the access characteristics for write operations are similar to access characteristics for read operations. As indicated by the sequence of entries, each entry in symmetric memory component 910 is independently addressable. That is, each entry in symmetric memory component 910 may be read or written using random access commands. And, executing a first write command to a first symmetric memory physical address does not affect the ability to execute a second read command to a second symmetric memory physical address that is proximate to the first symmetric memory physical address.

The asymmetric memory component 920 includes a collection of banks made up of one or more sectors (e.g., sector 930). In contrast with symmetric memory 910, in asymmetric memory 920, writing to an asymmetric memory physical address causes a disruption within a bank. That is, executing a first write command to a first asymmetric memory physical address adversely affects the ability to execute a second read command to a second asymmetric memory physical address that is proximate to the first asymmetric memory physical address.

Each of the entries in sector 930 is made up of a collection of entries. Although each entry may be individually accessed by the CPU using a random access read operation, writing to asymmetric memory does not permit random access write operations to be performed. Instead, asymmetric memory requires write operations to be performed as block write operations (e.g., a block input/output (IO) write), where each write includes, for example, 4 k of data. The memory controller may be limited by (1) the granularity at which the page table can translate a virtual address to a physical address in asymmetric memory, and (2) the granularity at which the CPU can access a virtual address. In the first instance, the memory controller may be limited to performing page level translations, that is, between a virtual address specifying a page and a physical address specifying a page. In the second instance, greater read granularity may be specified using an offset within a page to permit entry level access to one or more words while write granularity may be regulated by the internal structure limiting the manner in which content may be retrieved from the asymmetric memory component.

Because the asymmetric memory component 920 has different access characteristics than the symmetric memory component 910, a memory controller managing access to both components may selectively and intelligently structure the manner in which both components are utilized. For example, where the symmetric memory component 910 includes DRAM and the asymmetric memory component includes NOR flash, a memory controller may manage which content is loaded to DRAM and which content is loaded to NOR flash. And, even though some content may be stored in NOR flash at some point, certain application behaviors may cause an entry within a sector of NOR flash to be moved to DRAM.

Thus, in the course of managing the hybrid, memory system, sectors may be loaded from NOR flash to DRAM. Similarly, and depending on the configuration, entries within a sector of NOR flash may be loaded to the DRAM. These sectors and entries loaded from NOR flash to DRAM represent "holes" in the NOR flash in that the "holes" cannot be used for storing new entries without interrupting access to all content in the bank in which the "holes" appear.

Figure 10:
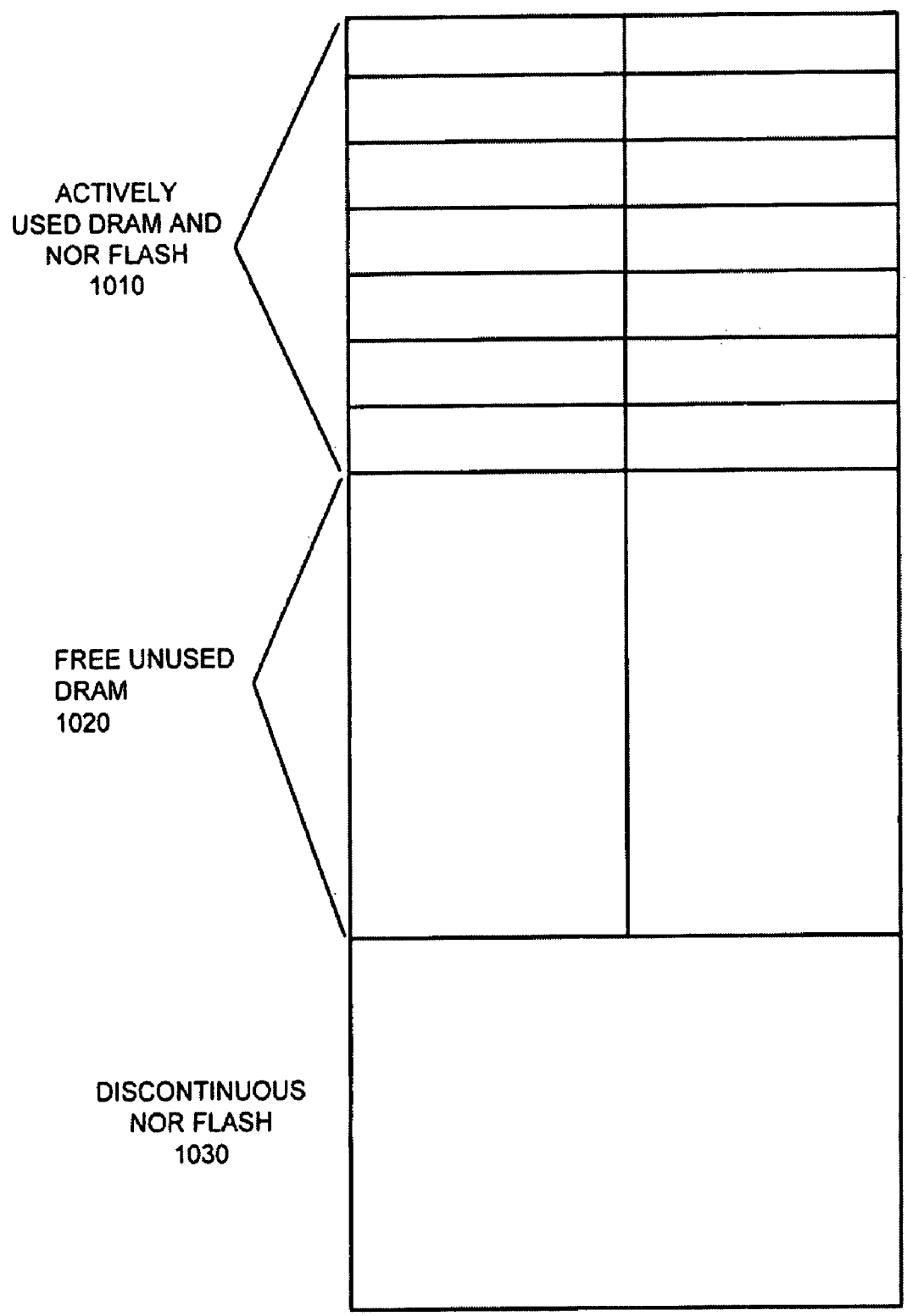
FIG. 10 is a diagram of a page table that indicates how a hybrid memory system for a computer system that includes an asymmetric memory component and a symmetric memory component is being used.

FIG. 10 is a diagram of a page table 1000 that indicates how a hybrid memory system for a computer system that includes an asymmetric memory component and a symmetric memory component is being used. In particular, page table 1000 illustrates how main memory may be organized into three different categories of storage. The first category, B310, includes actively used DRAM and NOR flash. Category 1010 illustrates those portions of the memory system that are being used in a desired manner. A memory controller trying to achieve better system performance may try and increase the size of category 1010 relative to other categories.

Category 1020 includes free DRAM that is not being used. In one configuration, category B320 is available to be used for write intensive data and to support special processing operations performed in response to detecting a write command addressed to a virtual address associated with NOR flash.

Category 1030 includes discontinuous NOR flash. Memory is discontinuous if the memory has unused "holes" between used regions. In addition to some of the challenges discussed above with respect to holes, identifying a region as being discontinuous may cause other challenges. First, additional processing operations may be required to identify the right storage in the first instance as ineligible storage locations are accessed, and analyzed for suitability. Second, the discontinuous nature may limit the size of write operations that are performed. For example, an application desiring to load 4 Mbytes of a contiguous search index is unable to do so if the "hole" is only 2 Mbytes. Although the memory controller may support the request to store the 4 Mbytes of content in asymmetric memory, the storage operation may be less than optimal. For example, this requirement may result in a contiguous search index being stored across two different locations. Storing the contiguous search index in two different locations may result in lower application performance as additional interconnect resources may be consumed to access the contiguous search index from two different locations.

The classification of a memory region as "active", "free" or "discontinuous" may be artificial in that in many instances, a memory region is not 100% utilized in order to be considered active, nor must a "free" region be 0% utilized. Similarly, the classification of a region as discontinuous may vary with the system and/or application, or with system and application performance. For example, where an application works with more granular data (e.g., a page), classification of a region as being discontinuous and thus suitable for a destination of integrated data may be based on whether a region is able to support writing a limited number of pages. In contrast, where an application performs larger writes, classification of a region as discontinuous may be based on the ability of the region to support the larger writes.

Figure 11:
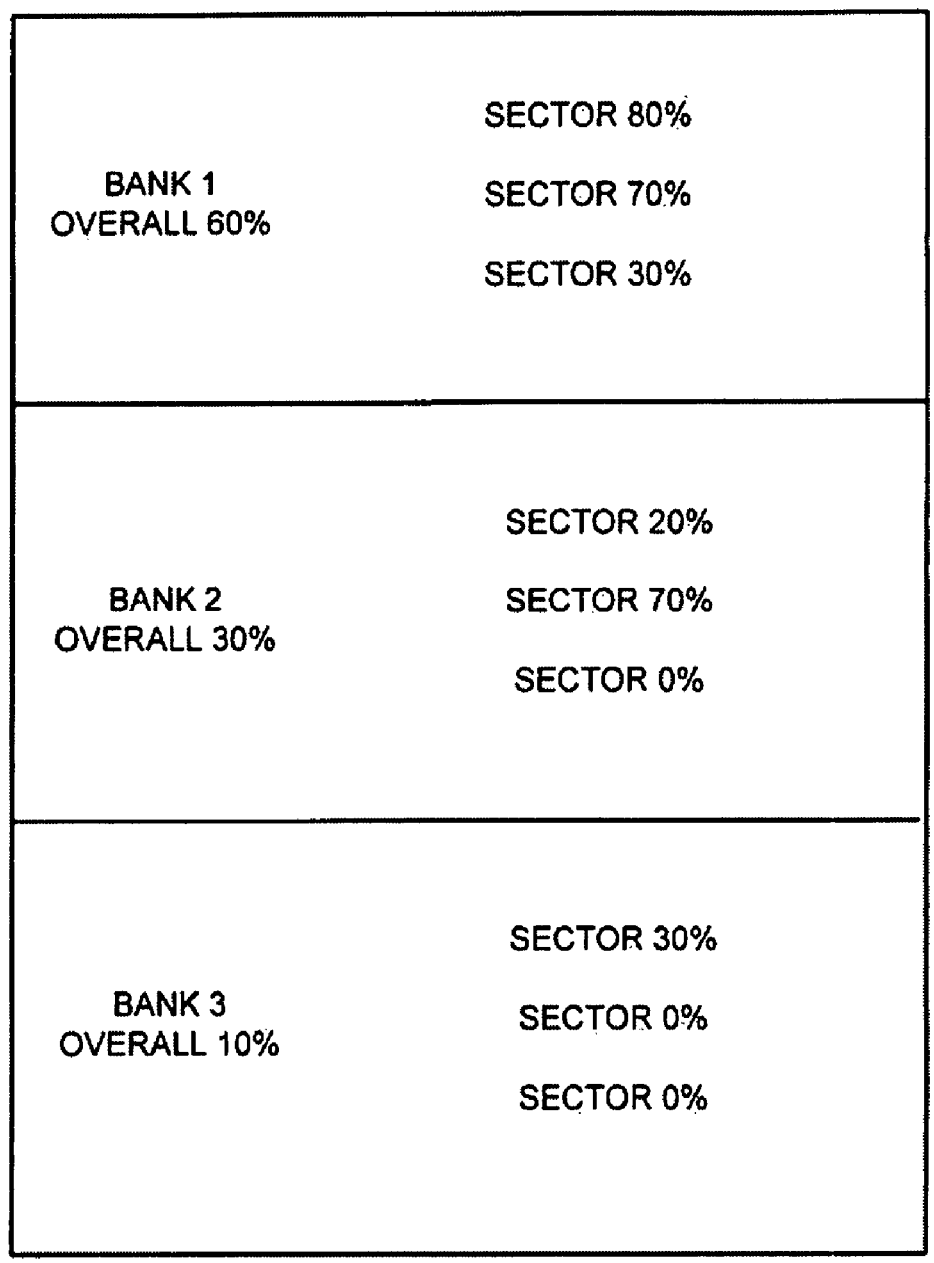
FIG. 11 is a diagram of a configuration for a collection of banks in an asymmetric memory component for a hybrid memory system within a computer system that indicates different levels of utilization.

FIG. 11 is a diagram of a configuration 1100 for a collection of banks in an asymmetric memory component of a hybrid memory system for a computer system that indicates different levels of utilization. Configuration 1100 indicates that a first bank with three sectors is being 60% utilized with three sectors that are being utilized at levels 80%, 70%, and 30%, respectively. The second bank is being 30% utilized with three sectors being utilized 20%, 70%, and 0%, respectively. The third bank is being 10% utilized with three sectors being 30%, 0%, and 0%.

In a situation where the memory controller is trying to minimize the impact on access to other data, the memory controller may decide to write to bank 3 because writing to bank 3 takes the smallest amount of data offline (10%) during a write operation. Depending on the amount of data being written, the memory controller maybe configured to use the second sector, which has not yet been used. Alternatively, if a page is being written, and the sector supports page-level writes within a sector, the memory controller may elect to write to the first sector.

In a situation where the "holes" occur throughout the asymmetric memory component, and the computer system is expected to be operating at near 100% capacity, the memory controller may be configured to write to bank 1, notwithstanding the impact of writing to the most heavily utilized bank. For example, if an application is building a large data structure that will require a tremendous amount of storage, the memory controller may attempt to keep each bank 100% utilized. Thus, the memory controller may be configured to add incremental amounts of data to each sector in bank 1 to make each sector 100% utilized. While the impact to reads from bank 1 may be disrupted, the memory controller may determine that the impact from loading of data to bank 1 on application performance is less than the impact of operating the memory system at less than a desired level of utilization.

In yet another situation where the memory controller attempts to load the collection of content entries periodically, bank 2 may be identified as the candidate if the collection of entries occupies an amount of storage equal to 70% of bank. For example, the entries may include a sector's worth of content and a marginal amount more that requires 30% of the second sector and 80% of the first sector.

Figure 12:
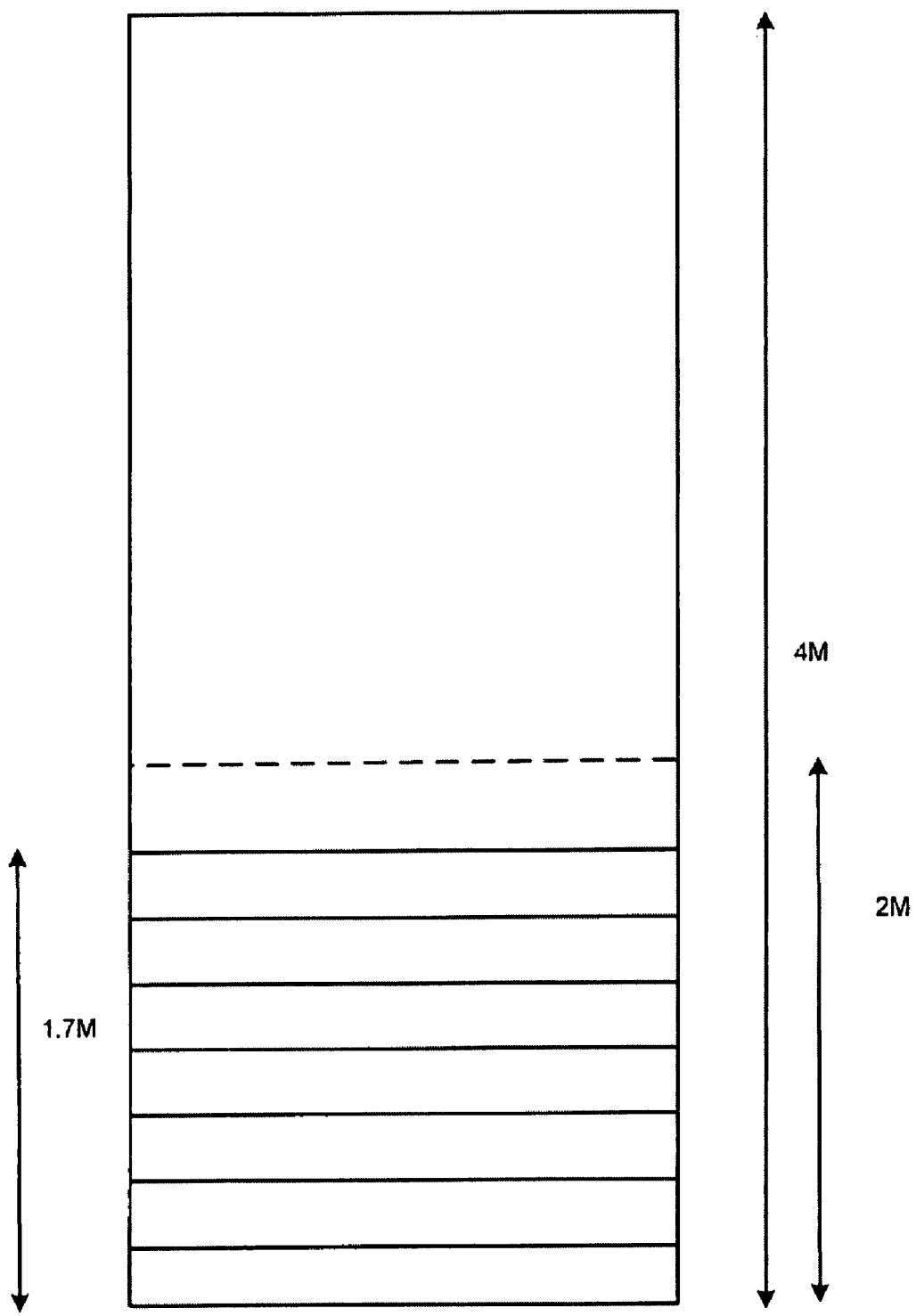
FIGS. 12-15 are diagrams illustrating four different configurations of data in DRAM, organized to facilitate writing of the data to a block in the asymmetric portion of the hybrid memory system.
Figure 13:
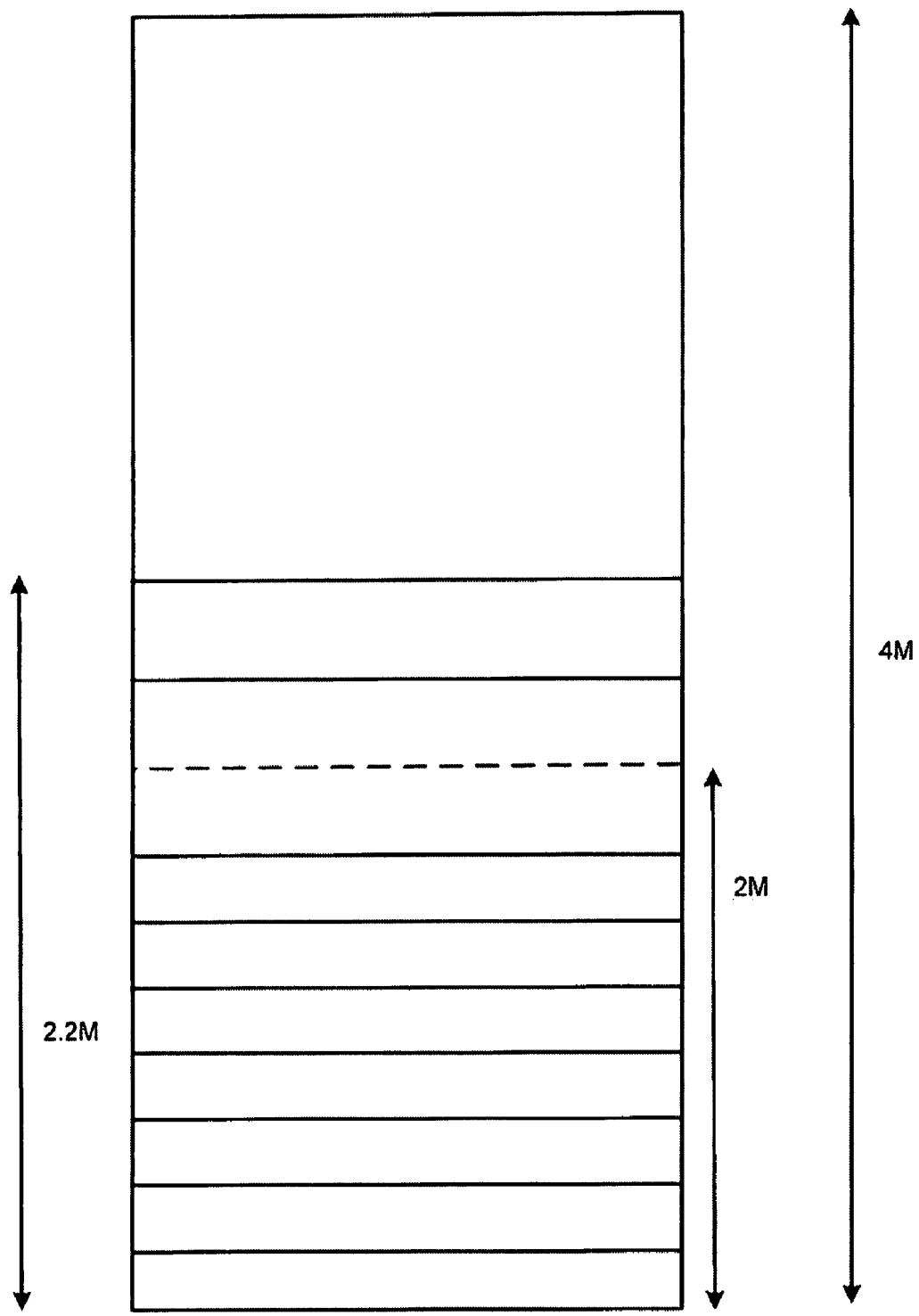

FIG. 12 is a diagram of a configuration 1200 for a collection of data in DRAM that is being organized in order to write the collection of data to a block in the asymmetric portion of the hybrid memory system. In particular, configuration 1200 indicates that the collection of content entries occupies 1.7 Mbytes of content. In order to be written to the asymmetric memory component, the memory controller requires that 2 Mbytes of storage exist. As shown, when a threshold of 2 Mbytes is required, another 300 Kbytes is required before the collection of content entries is loaded to the asymmetric memory component. Of course, if other criteria are used, such as a time threshold, the 1.7 Mbytes of content may be loaded. In contrast, FIG. 13 illustrates a configuration for a collection of content entries that does exceed the required threshold amount of content. FIG. 13 is a diagram of a configuration 1300 for a collection of data in DRAM that is being organized in order to write the collection of data to a block in the asymmetric portion of the hybrid memory system. As shown, configuration 1300 illustrates that the collection of content entries includes 2.2 Mbytes of content, more than the required 2 Mbytes.

Figure 14:
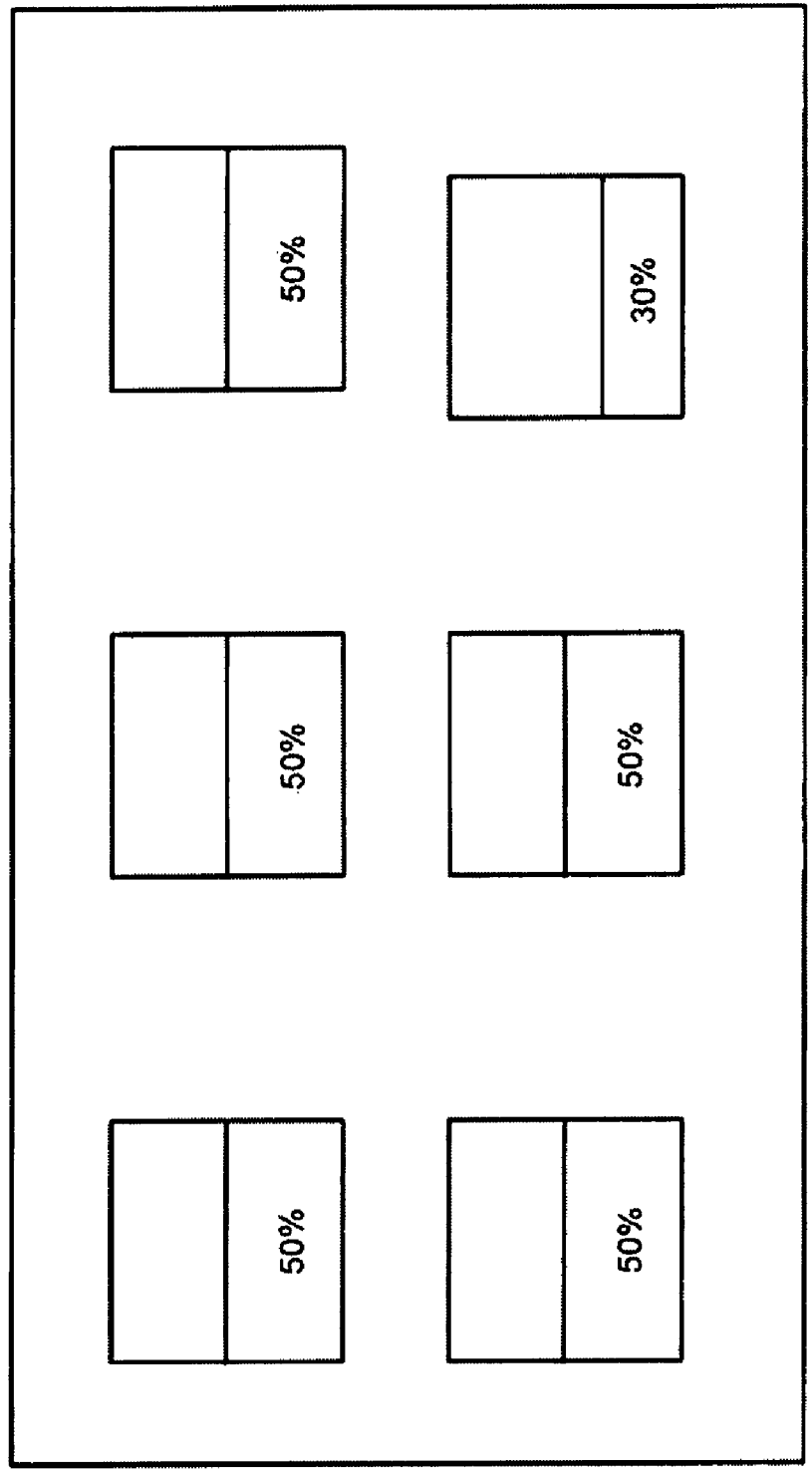
Figure 15:
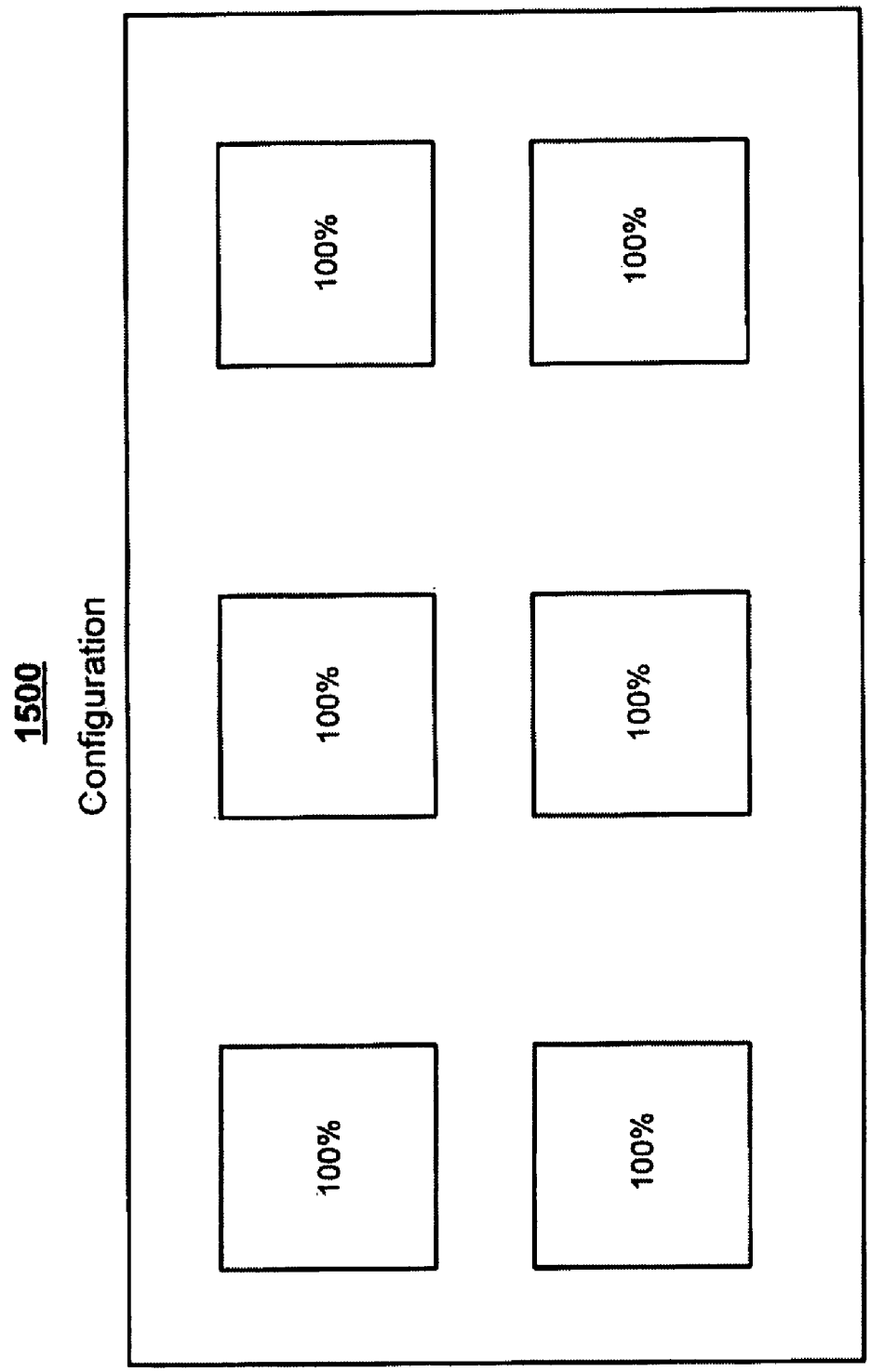

Although FIGS. 12 and 13 illustrate how data is being loaded with respect to a block of contiguous locations in asymmetric memory, the collection of content entries may be organized with a constituent organization designed to support how the asymmetric memory component will be accessed once the collection of content entries has been loaded to the asymmetric memory component. FIG. 14 is a diagram of a configuration 1400 for a collection of data in DRAM that is being organized in a bank structure in order to write the collection of data to a bank in the asymmetric portion of the hybrid memory system. In particular, configuration 1400 illustrates that a bank includes six blocks, with each blocking being organized so that it uses approximately 50% of the storage in the block. Five of the six constituent blocks have been established with the desired degree of utilization. The sixth block requires another 20% utilization before the block can be loaded when the threshold degree of utilization requires six blocks to be identified with 50% utilization. Alternatively, configuration 1400 can be loaded to a bank in response to detecting a triggering criteria (e.g., expiration of a timer). FIG. 15 is a diagram 1500 of a configuration for a collection of data in DRAM that is being organized in order to write the collection of data to a bank in the asymmetric portion of the hybrid memory system. In FIG. 15, configuration 1500 illustrates that the collection of content entries can be organized so that each constituent block is more fully utilized (e.g., approaching utilization levels closer to 100%).

Figure 16:
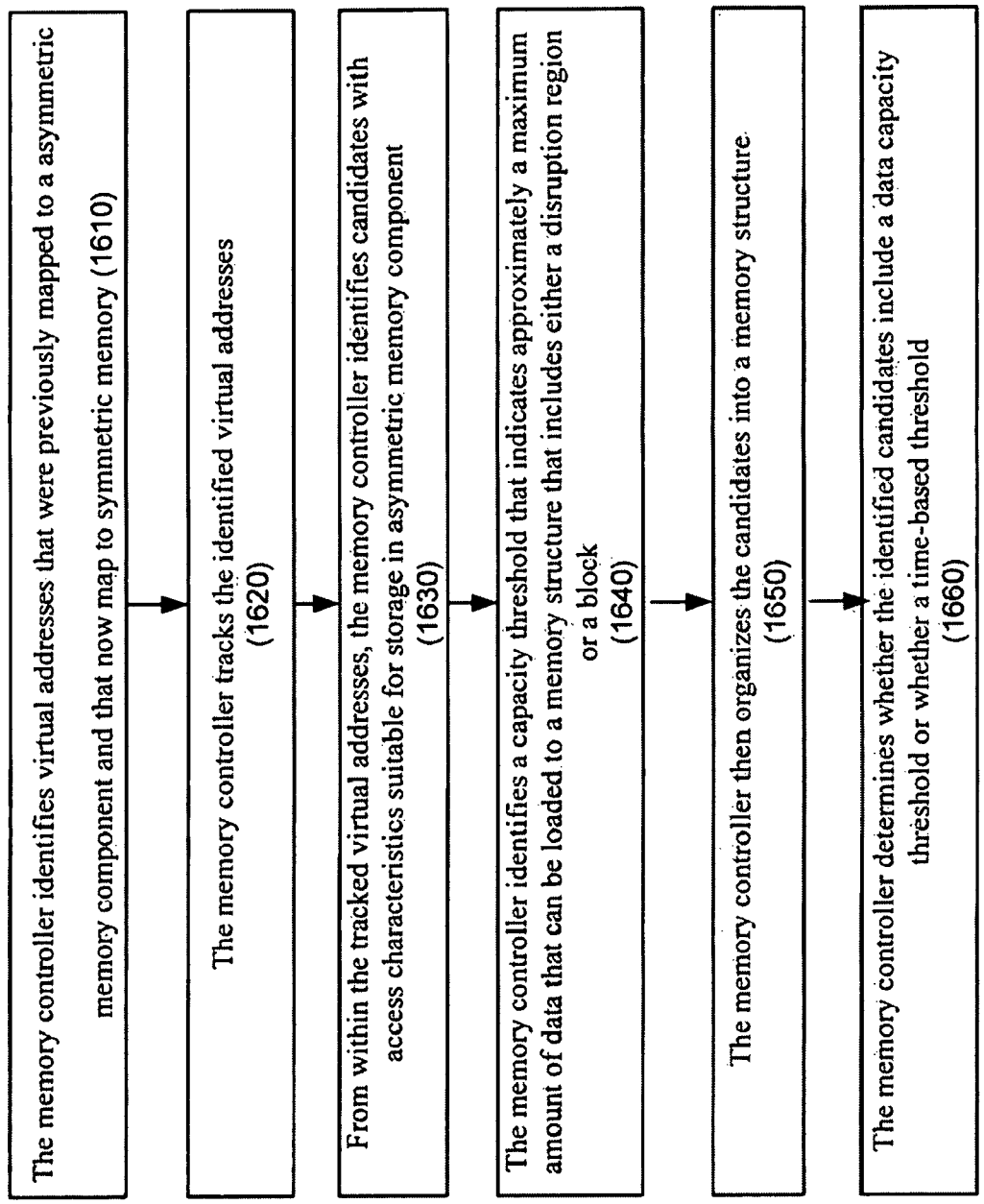
FIG. 16 is a flow chart of a process for loading a series of entries to a region of asymmetric memory.

FIG. 16 is a flow chart 1600 of a process for loading a series of entries to a region of asymmetric memory. In particular, flow chart 1600 illustrates how generating the collection of content entries includes organizing, in symmetric memory, an amount of data to be written corresponding to multiple blocks within a disruption region of the asymmetric memory component. Initially, the memory controller identifies virtual addresses that were previously mapped to an asymmetric memory component and that now map to symmetric memory (1610). That is, the memory controller is configured to identify which virtual addresses related to data that was previously stored in the asymmetric memory component. Alternatively, the memory controller identifies physical addresses that were previously mapped to an asymmetric memory component and that are now mapped to the symmetric memory component.

The memory controller tracks the identified virtual addresses (1620). Tracking the identified virtual addresses includes determining whether the identified virtual addresses continue to demonstrate access characteristics indicating that the data associated with the virtual address should be stored in the asymmetric memory component.

From within the tracked virtual addresses, the memory controller identifies candidates with access characteristics suitable for storage in asymmetric memory component (1630). For example, the memory controller may determine that some virtual addresses are not good candidates because they are associated with more than a threshold rate or number of write operations (e.g., one or more write operations in a window of time). Alternatively or in addition, the memory controller may track how often a virtual address is read and then identify candidates based on which virtual addresses are the most read.

The memory controller identifies a capacity threshold that indicates approximately a maximum amount of data that can be loaded to a memory structure that includes either a disruption region or a block (1640). Put differently, the memory controller identifies an amount of content that is required to fully utilize a memory structure in asymmetric memory (e.g., one or more blocks or a bank)

The memory controller then organizes the candidates into a memory structure (1650). For example, the memory controller may create a record that indicates how a memory controller should load a structure within the asymmetric memory component. In one configuration, organizing the candidates includes loading the candidates to a mirror of the proposed structure in DRAM. In another configuration, organizing the candidates includes creating a record in DRAM that indicates the address ranges that should be read in order to write the candidates to the asymmetric memory component.

The memory controller determines whether the identified candidates include a data capacity threshold or whether a time-based threshold (1660). In one configuration, the memory controller determines whether loading the identified candidates to the asymmetric memory component would result in one of the constituent structures within the asymmetric memory component being used near a desired capacity. Thus, the memory controller may determine whether the identified candidates require one or more block's worth of storage, or even one or more bank's worth of storage.

The memory controller then loads the identified candidates to the memory structure in response to determining that the identified candidates include a capacity threshold of data (1670). Thus, a structure within the asymmetric memory component receives the identified candidates during a write operation, which in turn becomes a disruption region during the write operation.

As for the time-based threshold, the memory controller may be configured to automatically migrate data With suitable access characteristics on a periodic basis, even if less than a capacity threshold of data exists. Alternatively or in addition, timing criteria and thresholds may be used to determine the data capacity threshold. For example, a first data capacity threshold may be used if the data has migrated within first window of time. If the data has not been migrated within the first window of time, a second capacity threshold may be used. Although time based criteria may impose a greater computational burden or lead to operation in a less efficient mode, using time based criteria may result in better performance during subsequent operations or shield the computer system from undesirable faults. For example, time based criteria may increase the likelihood that a search index (or a larger portion of a search index) is immediately available in the asymmetric memory component upon system reboot. This, in turn, may reduce the computation burden imposed by migrating a search index to the asymmetric memory component upon reboot.

The memory controller may have additional candidates that require more than the capacity threshold of storage and less than the next threshold required to load another collection of the identified candidates to asymmetric memory. In addition, the memory controller may continue identifying virtual addresses for data that is loaded from the asymmetric memory component to the symmetric memory component. In any event, in response to determining that the identified candidates do not include a capacity threshold of data, the memory controller accumulates additional candidates until a capacity threshold of data is available to load to the asymmetric memory structure (1680). Once a capacity of threshold data has been accumulated, an additional write operation may be performed to write the additional accumulation of identified candidates to the asymmetric memory component.

Although flow chart 1600 described performing one or more operations using virtual addresses that were previously mapped to the asymmetric memory component, the operations described in flow chart H00 also may be performed using data that continues to be stored within the asymmetric memory component. For example, the identified candidates also may include data in an asymmetric memory component that includes more than a threshold number of "holes" or is being used with less than a threshold degree of utilization.

Figure 17:
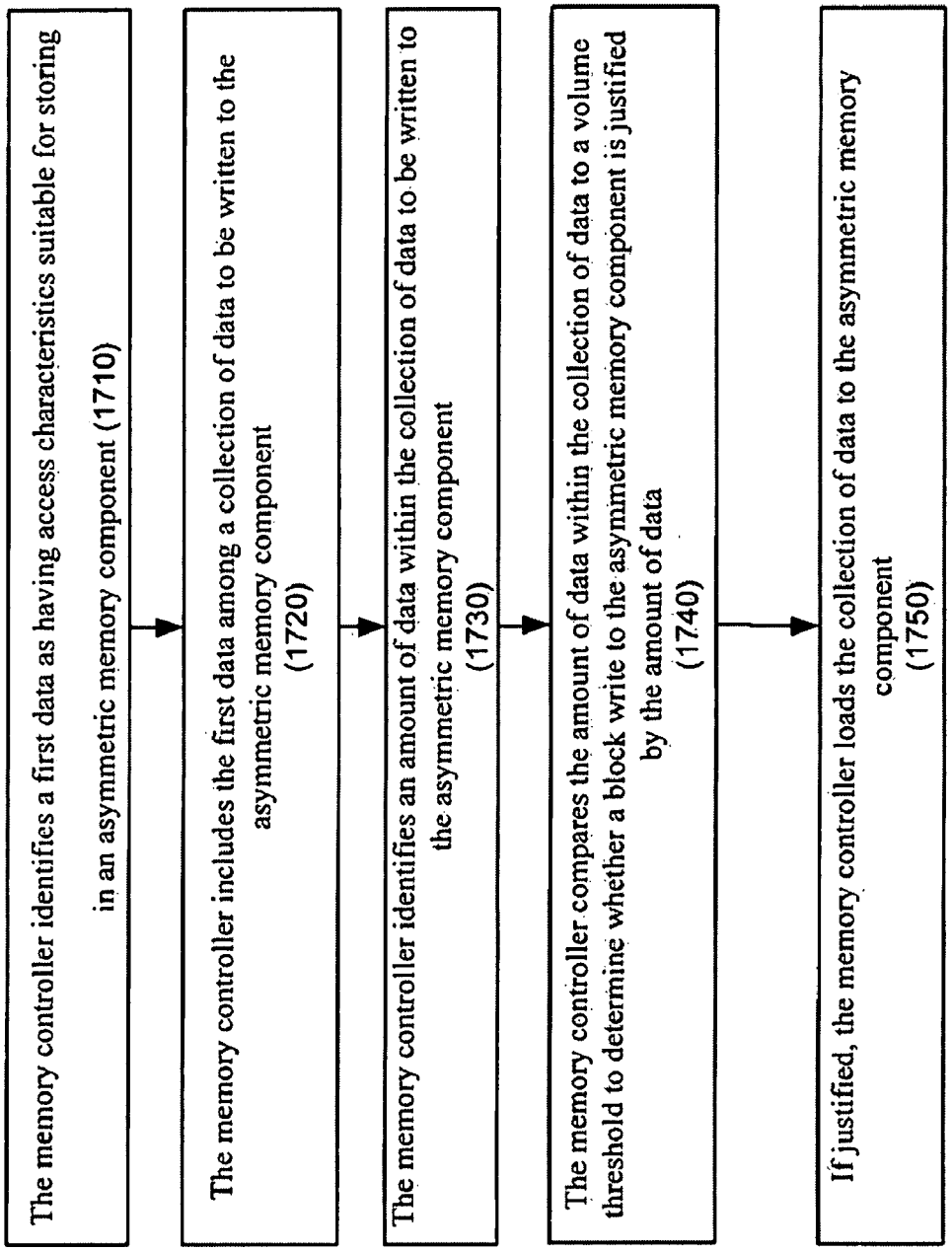
FIG. 17 is a flow chart of a process for loading a series of entries to NOR flash memory by allowing some of the entries being collected for writing to asymmetric memory to come from locations in asymmetric memory.

FIG. 17 is a flow chart 1700 of a process for loading a series of entries to asymmetric memory by allowing some of the entries being collected for writing to asymmetric memory to come from locations in asymmetric memory. In particular, flow chart 1700 illustrates a process by which data stored within symmetric and asymmetric memory components of main memory is integrated and stored within at least one asymmetric memory component.

Initially, the memory controller identifies a first data as having access characteristics suitable for storing in an asymmetric memory component (1710). In one example, identifying the first data includes identifying data that has been moved to a symmetric memory component as a result of a write operation to the asymmetric memory component. The first data may include data that is infrequently updated or represents data that is part of a page with two different portions with each portion having different access characteristics. The first data may be identified as one of the portions with access characteristics suitable for storage in the asymmetric memory component. In another example, the first data includes content in an asymmetric memory component, where the asymmetric memory component is being used in a less than desirable manner (e.g., replete with holes). The memory controller includes the first data among a collection of data to be written to the asymmetric memory component (1720). In one configuration, including the first data in the collection of data includes loading the data to a symmetric memory component organized in the manner in which the collection of data will be loaded to the asymmetric memory component. In another configuration, including the first data in the collection of data includes creating a structure that indicates the addresses where the memory controller should access the data in order to load data to the asymmetric memory component.

The memory controller identifies an amount of data within the collection of data to be written to the asymmetric memory component (1730). The memory controller may identify an amount of content required to fully utilize a bank of storage.

The memory controller compares the amount of data within the collection of data to a volume threshold to determine whether a block write to the asymmetric memory component is justified by the amount of data (1740). The memory controller determines whether the collection of data includes enough content to use the asymmetric memory component in the intended manner.

If justified, the memory controller loads the collection of data to the asymmetric memory component (1750). In one configuration, loading the collection of data to the asymmetric memory component includes loading an organized portion from DRAM to NOR flash. In another configuration, loading the collection of data includes loading a record with addresses that identify where the different portions of the collection of data are stored, and then having the memory controller use the addresses to load the collection of data to the asymmetric memory component so that, for example, data may be loaded from other portions of the asymmetric memory component.

Figure 18:
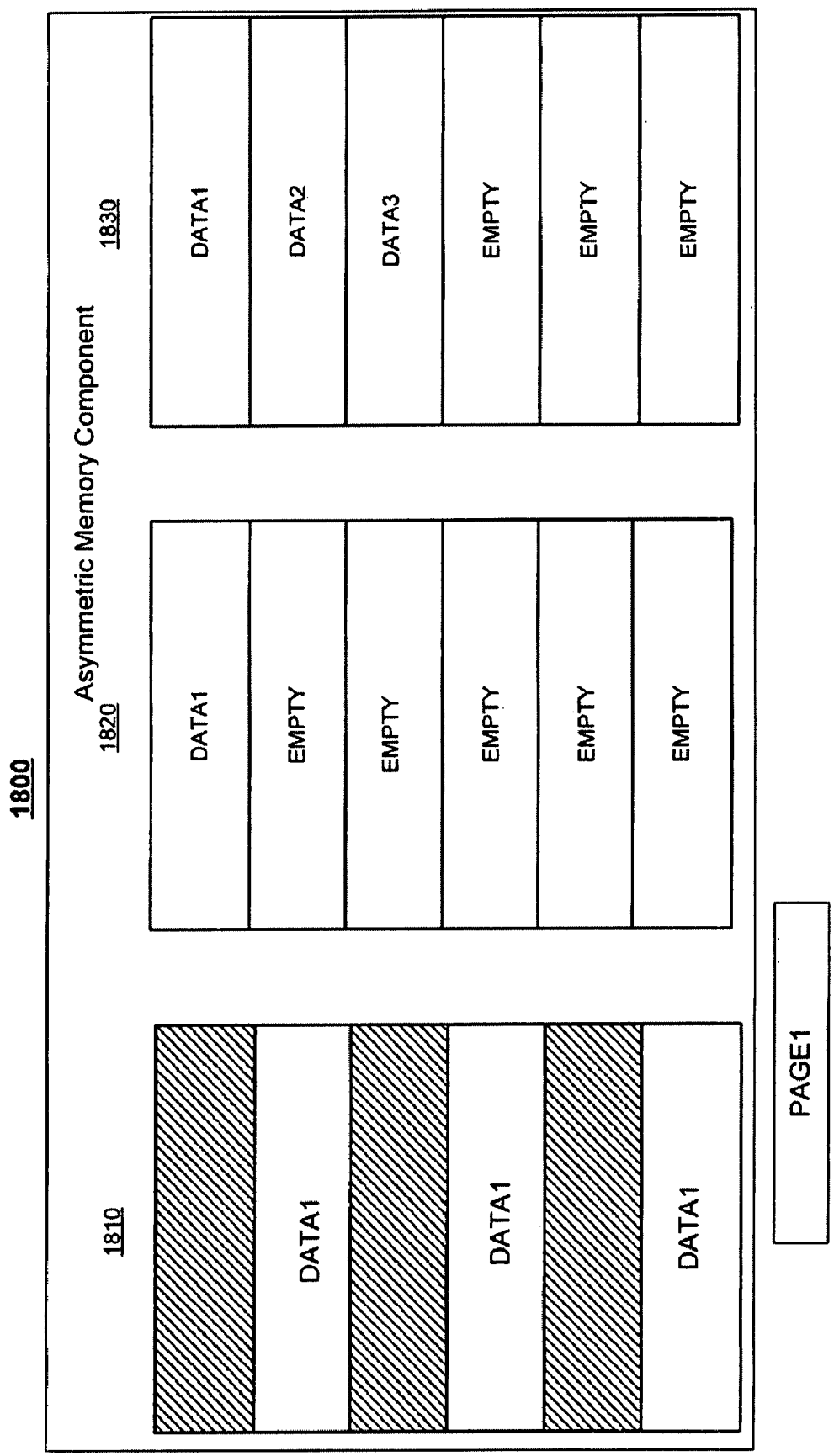
FIGS. 18 and 19 are diagrams of configurations for a hybrid memory system that illustrate how a memory controller may identify a region of asymmetric memory based on the nature of the write being performed and the state of the region.
Figure 19:
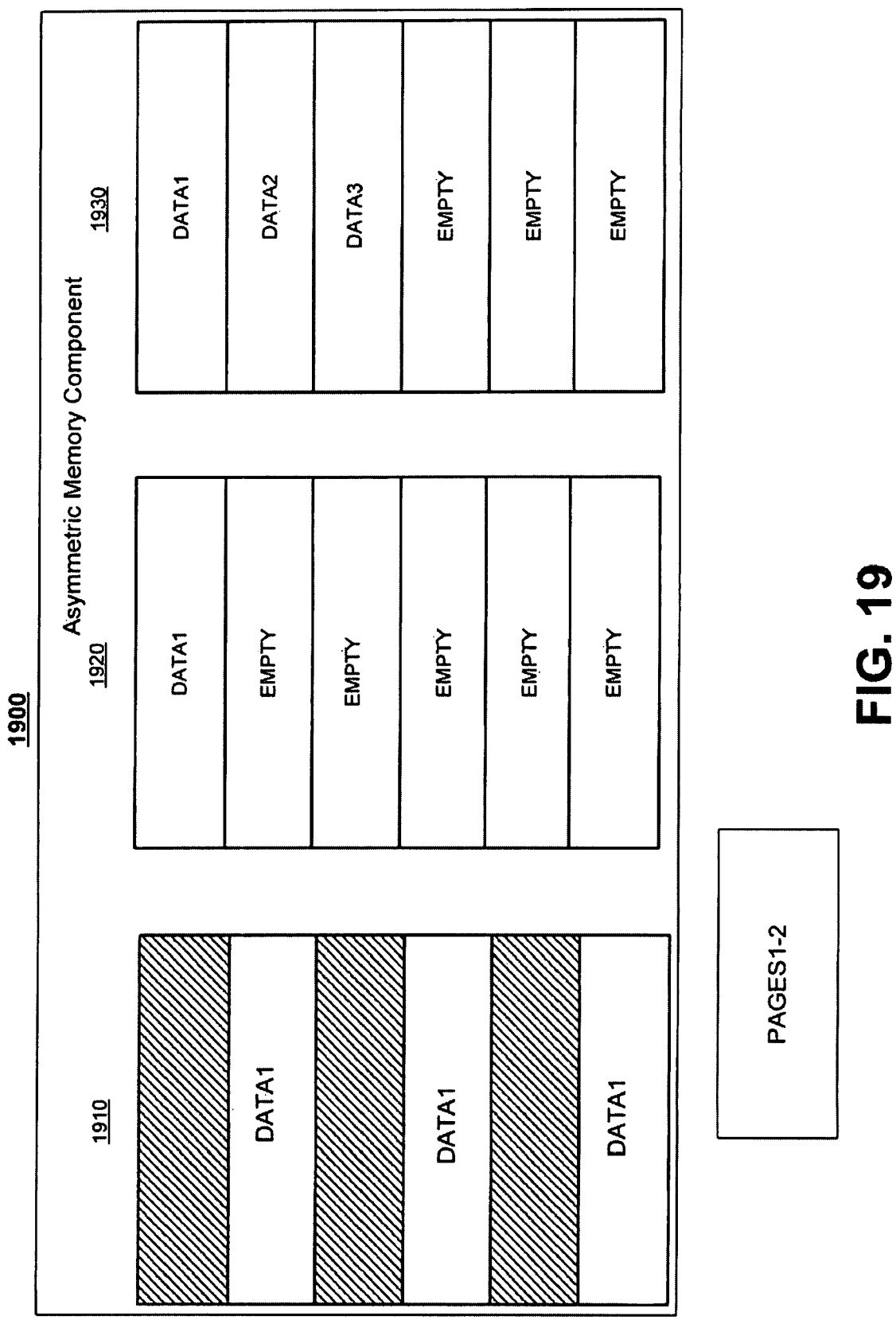

FIGS. 18 and 19 are diagrams of configurations 1800 and 1900 for a hybrid memory system that illustrate how a memory controller may identify a region of asymmetric memory based on the nature of the write being performed and the state of the region. Configurations 1800 and 1900 illustrate three candidate storage locations within an asymmetric memory component, 1810, 1820, and 1830 within configuration 1800, and 1910, 1920, and 1930 within configuration 1900. Each of the candidate locations represents a bank or a "disruption region." In configuration 1800, the memory controller is inspecting a single page (PAGE1) to determine which of the candidate locations should be used to store PAGE1. The first candidate location, 1810, is 50% utilized with two "holes" between two active sectors. Writing to candidate location 1810 means that 50% of the stored content in the bank (representing a disruption region) is unavailable. However, candidate location 1810 is being used in a less than desirable manner with the two holes. Thus, executing a smaller write operation may result in increased system performance as the utilization for candidate location J10 as memory utilization goes from 50% utilization to 66% utilization, where each of the striped unused regions represents a page.

Candidate location 1820 is 16% utilized, with five portions eligible for a write. Candidate location 1820 is a strong candidate in that the least amount of data is unavailable during the write operation, and the write operation requires the least amount of time. However, candidate location 1820 may be a better candidate for other write operations involving more data. Put differently, even though the effect of writing to candidate location J20 is the lowest of the three candidates shown, candidate location 1820 may be preserved for other write operations that are more disruptive (e.g., involve more data).

Candidate location 1830 also is 50% utilized. The overall amount of data becoming unavailable during a write is the same as the amount of data unavailable during a write to the candidate location 1810. However, candidate location 1830 is structured to support the sequential addition of data. Candidate location 1830 is therefore configured to support the addition of 1-3 pages. As a result, while writing DATA1 to candidate location 1830 may be as burdensome as writing to candidate location 1820, candidate location 1830 may be used in one configuration in order to save candidate location 1820 for multi-page writes that may be either sequential or non-sequential in nature.

In contrast, configuration 1900 features a multi-page write being written. If the internal structure of PAGES1-2 spans the boundary between the first page and the second page, the memory controller may elect to avoid candidate location 1910. Candidate location 1920 represents the least burdensome candidate location because the smallest amount of data is being taken offline in order to support the write. Although candidate location 1930 also is a candidate, candidate location 1930 may be less desirable than candidate location 1920 because writing to candidate location 1930 takes more data offline.

Although aspects of the memory controller were described as managing both the symmetric memory components and the asymmetric memory components, the memory controller may be dedicated to a single type of memory (e.g., an asymmetric memory component) in a hybrid memory system that includes symmetric memory components and asymmetric memory components. Multiple memory controllers may be used. For example, the asymmetric memory components may be encapsulated in DIM packaging that includes a memory controller in each module. Thus, a computer system with three DIMM-encapsulated asymmetric memory components may include three memory controllers. The computer system may optionally use a separate memory controller for the symmetric memory components, or rely on functionality elsewhere (e.g., in the CPU) to act as a memory controller.

Other implementations are within the scope of the following claims. For example, the memory controller may be configured to organize a collection of data so that the collection of data includes more than a first threshold of data and less than a second threshold of data.

What is claimed is:

1. A method of integrating data stored within symmetric and asymmetric memory components of main memory and storing the resultant integrated data within at least one asymmetric memory component, where the symmetric memory components are each configured to enable random access write operations in which an address within a block of the symmetric memory component is written without affecting the availability of other addresses within the block of the symmetric memory component, and where the asymmetric memory components are each configured to enable block write operations in which a write to an address within a block of one of the asymmetric memory components affects the availability of other addresses within the block of the asymmetric memory component, the method comprising:

receiving a write command to write data to a virtual address associated with a first physical address of an asymmetric memory component of the main memory;

configuring a page table to change an association of the virtual address from the association to the first physical address of the asymmetric memory component of the main memory to a second physical address of a symmetric memory component of the main memory;

generating an indication that the first physical address is available for association with another virtual address in a subsequent block write operation;

identifying a collection of one or more content entries with access characteristics suitable for storage in the asymmetric memory component, the collection of content entries including data corresponding to the virtual address for which the association was changed from the first physical address of the asymmetric memory component of the main memory to the second physical address of the symmetric memory component of the main memory;

determining whether the collection of content entries collectively occupy a threshold amount of storage or whether a threshold period of time has elapsed since the association of the virtual address was changed from the first physical address of the asymmetric memory component of the main memory to the second physical address of the symmetric memory component of the main memory; and in response to determining that the collection of content entries collectively occupy the threshold amount of storage or that the threshold period of time has elapsed:

identifying memory utilization characteristics of multiple regions included in the asymmetric memory component;

analyzing the identified memory utilization characteristics;

based on the analysis of the identified memory utilization characteristics, selecting, from among the multiple regions included in the asymmetric memory component, a region in the asymmetric memory component; and loading the collection of content entries to the selected region of the asymmetric memory component using a block write command.

2. The method of claim 1 wherein loading the collection of content entries to the region of the asymmetric memory component includes loading the collection of content entries to a region of the asymmetric memory component that is associated with the first physical address using a block write command.

3. The method of claim 1 wherein the asymmetric memory component of main memory includes NOR flash and the symmetric memory component includes dynamic random access memory (DRAM) and further comprising:

receiving a write command to write data to virtual address associated with a first physical address that maps to the NOR flash memory;

configuring a page table to change an association of the virtual address from the association to the first physical address that maps to the NOR flash memory to a second physical address that maps to DRAM memory;

enabling association of the first physical address with another virtual address;

identifying a collection of content entries of content with access characteristics suitable for storage in the NOR flash memory;

determining whether the collection of content entries of content includes a threshold amount of storage; and loading, in response to determining whether the collection of content entries of content requires the threshold amount of storage, the collection of content entries to the NOR flash using a block write command.

4. The method of claim 3 wherein loading, in response to determining whether the collection of content entries of content requires the threshold amount of storage, the collection of content entries to the NOR flash includes loading, in response to determining whether the collection of content entries of content requires the threshold amount of storage, the collection of content entries to the NOR flash that is proximate to the first physical address.

5. The method of claim 1 wherein identifying the collection of content entries includes organizing, in symmetric memory, an amount of data to be written corresponding to a size of a sector within a bank of NOR flash.

6. The method of claim 1 wherein identifying the collection of content entries includes organizing, in symmetric memory, an amount of data to be written corresponding to a size of multiple blocks within a disruption region of the asymmetric memory component in which a write to an address within a block of one of the asymmetric memory components affects the availability of other addresses within the disruption region of the asymmetric memory component.

7. The method of claim 6 wherein organizing the amount of data includes structuring each block to include more than a first threshold of data and less than a second threshold of data.

8. The method of claim 7 wherein structuring each block to include more than the first threshold of data and less than the second threshold of data includes structuring each block to include more than the first threshold of data and less than the second threshold of data in response to determining that a system is not constrained for memory resources.

9. The method of claim 6 further comprising structuring each block to support a sequential addition of data within the block.

10. The method of claim 6 wherein organizing the amount of data includes:

structuring a first block within the disruption region to include more than a first threshold of data;

in response to determining that a particular write instruction configured to load data to the first block exceeds the first threshold, identifying a second block of data; and organizing additional data to be loaded to the second block of data.

11. The method of claim 6 wherein structuring the amount of block writes includes:

identifying a threshold amount of data for a disruption region;

organizing the threshold amount of data into a collection of block organizations;

configuring a memory controller to load the collection of block organizations into the disruption region.

12. The method of claim 6 wherein organizing the amount of data includes:

identifying virtual addresses that were previously mapped to asymmetric memory component and that now map to symmetric memory;

tracking the identified virtual addresses;

identifying candidates with access characteristics suitable for use in asymmetric memory component;

identifying a capacity threshold that indicates approximately a maximum amount of data that can be loaded to a memory structure that includes either a disruption region or a block;

organizing the candidates into a memory structure;

determining whether the identified candidates include a capacity threshold of data;

loading, in response to determining that the identified candidates include a capacity threshold of data, the identified candidates to the memory structure; and accumulating, in response to determining that the identified candidates do not include a capacity threshold of data, additional candidates until a capacity threshold of data is available to load to the memory structure.

13. The method of claim 12 wherein identifying the capacity threshold includes identifying the capacity threshold in response to determining that a system is constrained for memory resources.

14. The method of claim 12 further comprising:

using a sequential add threshold that is different than the threshold amount of storage in response to determining that the collection of content entries can be added sequentially using the sequential write to the one or more blocks within the asymmetric memory component.

15. The method of claim 1 further comprising:

identifying a disruption region in the asymmetric memory component;

identifying one or more blocks within the disruption region;

determining that the one or more blocks within the disruption region do not need to replaced;

determining that the collection of content entries can be added sequentially using a sequential write to the one or more blocks within the asymmetric memory component; and adding the collection of content entries to the disruption region using a sequential write.

16. The method of claim 1 wherein determining whether the collection of content entries collectively occupy the threshold amount of storage or whether the threshold period of time has elapsed includes specifying the threshold amount of storage based on a utilization level of the main memory.

17. The method of claim 16 wherein determining whether the collection of content entries collectively occupy the threshold amount of storage or whether the threshold period of time has elapsed includes specifying the threshold amount of storage in response to identifying a state for a component within the asymmetric memory component.

18. The method of claim 1 wherein determining whether the collection of content entries collectively occupy the threshold amount of storage or whether the threshold period of time has elapsed includes requiring that the collection of entries be written to the asymmetric memory component even if the collection of entries do not occupy the threshold amount of storage.

19. The method of claim 1 wherein determining whether the collection of content entries collectively occupy the threshold amount of storage or whether the threshold period of time has elapsed includes:
   identifying an impact on disruption of read operations against data stored in the asymmetric memory component caused by loading the collection of entries to the asymmetric memory component; and
   specifying the threshold amount of storage in response to identifying the impact.

20. The method of claim 1 wherein selecting, from among the multiple regions included in the asymmetric memory component, the region in the asymmetric memory component comprises:
   determining which of the multiple regions minimizes an amount of data that is disrupted during the block write command based on the analysis of the identified memory utilization characteristics; and
   based on the determination of which of the multiple regions minimizes the amount of data that is disrupted during the block write command, selecting, from among the multiple regions included in the asymmetric memory component, a region in the asymmetric memory component.

21. The method of claim 20 wherein:
   identifying memory utilization characteristics of multiple regions included in the asymmetric memory component comprises identifying a present amount of memory utilization for each of multiple regions included in the asymmetric memory component;
   analyzing the identified memory utilization characteristics comprises analyzing the present amount of memory utilization for each of multiple regions included in the asymmetric memory component; and
   determining which of the multiple regions minimizes the amount of data that is disrupted during the block write command based on the analysis of the identified memory utilization characteristics comprises determining which of the multiple regions has a lowest amount of memory utilization based on the analysis of the present amount of memory utilization for each of the multiple regions included in the asymmetric memory component.

22. The method of claim 21 wherein determining which of the multiple regions has a lowest amount of memory utilization comprises determining which of the multiple regions has a lowest amount of memory population density.

23. The method of claim 1 further comprising identifying an amount of storage collectively occupied by the collection of content entries, wherein:
   identifying memory utilization characteristics of multiple regions included in the asymmetric memory component comprises identifying a distribution of data within each of at least one of the multiple regions included in the asymmetric memory component;
   analyzing the identified memory utilization characteristics comprises analyzing the identified amount of storage collectively occupied by the collection of content entries with respect to the identified distribution of data; and
   selecting the region in the asymmetric memory component comprises:
      determining whether the identified amount of storage collectively occupied by the collection of content entries fits within the identified distribution of data; and
      selecting, from among the multiple regions included in the asymmetric memory component, a region in the asymmetric memory component based on the determination of whether the identified amount of storage collectively occupied by the collection of content entries fits within the identified distribution of data.

24. The method of claim 23 wherein:
identifying the distribution of data within at least one of the multiple regions included in the asymmetric memory component comprises identifying, within at least one of the multiple regions included in the asymmetric memory component, a sequential range of presently unused physical addresses in the asymmetric memory component that are surrounded by presently used physical addresses in the asymmetric memory component; and
determining whether the identified amount of storage collectively occupied by the collection of content entries fits within the identified distribution of data comprises:
   determining a size of the sequential range of presently unused physical addresses within the at least one of the multiple regions included in the asymmetric memory component; and
   based on the determination of the size of the sequential range of presently unused physical addresses, determining whether the identified amount of storage collectively occupied by the collection of content entries fits within the sequential range of presently unused physical addresses; and
selecting, from among the multiple regions included in the asymmetric memory component, the region in the asymmetric memory component based on the determination of whether the identified amount of storage collectively occupied by the collection of content entries fits within the identified distribution of data comprises selecting, from among the multiple regions included in the asymmetric memory component, a region in the asymmetric memory component based on the determination of whether the identified amount of storage collectively occupied by the collection of content entries fits within the sequential range of presently unused physical addresses.

25. The method of claim 23 wherein:
identifying the distribution of data within each of at least one of the multiple regions included in the asymmetric memory component comprises:
   identifying, within a first of the multiple regions included in the asymmetric memory component, a first sequential range of presently unused physical addresses; and
   identifying, within a second of the multiple regions included in the asymmetric memory component, a second sequential range of presently unused physical addresses;

determining whether the identified amount of storage collectively occupied by the collection of content entries fits within the identified distribution of data comprises:
  determining a first size of the first sequential range of presently unused physical addresses;
  determining a second size of the second sequential range of presently unused physical addresses, the second size being different than the first size;
  determining that the first size is greater than or equal to the identified amount of storage collectively occupied by the collection of content entries;
  determining that the second size is greater than or equal to the identified amount of storage collectively occupied by the collection of content entries; and
  determining whether the identified amount of storage collectively occupied by the collection of content entries is closer in size to the first size or the second size; and
selecting the region in the asymmetric memory component comprises selecting a region in the asymmetric memory component based on the determination of whether the identified amount of storage collectively occupied by the collection of content entries is closer in size to the first size or the second size.

26. The method of claim 1 further comprising:
in response to determining that the collection of content entries collectively occupy the threshold amount of storage or that the threshold period of time has elapsed, determining application characteristics that reflect behaviors of at least one presently-active application,
wherein analyzing the identified memory utilization characteristics further comprises analyzing the determined application characteristics, and
wherein selecting, from among the multiple regions included in the asymmetric memory component, the region in the asymmetric memory component comprises selecting, from among the multiple regions included in the asymmetric memory component, the region in the asymmetric memory component based on the analysis of the identified memory utilization characteristics and the determined application characteristics.

27. The method of claim 26 wherein selecting, from among the multiple regions included in the asymmetric memory component, the region in the asymmetric memory component based on the analysis of the identified memory utilization characteristics and the determined application characteristics comprises:
  determining which of the multiple regions has an impact on application performance resulting from the block write command that is less than a threshold of impact on application performance; and
  based on the determination of which of the multiple regions has an impact on application performance resulting from the block write command that is less than the threshold of impact on application performance, selecting, from among the multiple regions included in the asymmetric memory component, a region in the asymmetric memory component that has an impact on application performance resulting from the block write command that is less than the threshold of impact on application performance.

28. The method of claim 26 wherein selecting, from among the multiple regions included in the asymmetric memory component, the region in the asymmetric memory component based on the analysis of the identified memory utilization characteristics and the determined application characteristics comprises:
  determining which of the multiple regions has the least impact on application performance resulting from the block write command; and
  based on the determination of which of the multiple regions minimizes has the least impact on application performance resulting from the block write command, selecting, from among the multiple regions included in the asymmetric memory component, a region in the asymmetric memory component.

29. The method of claim 28 wherein determining which of the multiple regions minimizes the impact on application performance resulting from the block write command comprises:
  determining that the application characteristics indicate that an application is building a large data structure that requires a relatively high level of memory utilization; and
  identifying a region in the asymmetric memory component for which the impact on application performance resulting from potential disruption of read operations during the block write command is less than the impact on application performance resulting from operating at less than a desired level of memory utilization caused by selecting another of the multiple regions that would have a lower impact on application performance resulting from potential disruption of read operations during the block write command.

30. The method of claim 1 wherein:
determining whether the collection of content entries collectively occupy a threshold amount of storage or whether a threshold period of time has elapsed since the association of the virtual address was changed from the first physical address of the asymmetric memory component of the main memory to the second physical address of the symmetric memory component of the main memory comprises determining whether a threshold period of time has elapsed since the association of the virtual address was changed from the first physical address of the asymmetric memory component of the main memory to the second physical address of the symmetric memory component of the main memory, and
loading the collection of content entries to the selected region of the asymmetric memory component using the block write command occurs in response to the determination that the threshold period of time has elapsed since the association of the virtual address was changed from the first physical address of the asymmetric memory component of the main memory to the second physical address of the symmetric memory component of the main memory.

31. The method of claim 1 wherein determining whether the collection of content entries collectively occupy a threshold amount of storage or whether a threshold period of time has elapsed since the association of the virtual address was changed from the first physical address of the asymmetric memory component of the main memory to the second physical address of the symmetric memory component of the main memory comprises determining whether the collection of content entries collectively occupy a threshold amount of storage that is determined based on an amount of time that has elapsed since the association of the virtual address was changed from the first physical address of the asymmetric memory component of the main memory to the second physical address of the symmetric memory component of the main memory, further comprising:

tracking an amount of time that has elapsed since the association of the virtual address was changed from the first physical address of the asymmetric memory component of the main memory to the second physical address of the symmetric memory component of the main memory;

identifying a first threshold amount of storage that corresponds to a first amount of time since the association of the virtual address was changed from the first physical address of the asymmetric memory component of the main memory to the second physical address of the symmetric memory component of the main memory;

based on the tracking, determining that the collection of content entries collectively occupy less than the first threshold amount of storage when the first amount of time since the association of the virtual address was changed from the first physical address of the asymmetric memory component of the main memory to the second physical address of the symmetric memory component of the main memory has elapsed; and in response to the determination that the collection of content entries collectively occupy less than the first threshold amount of storage when the first amount of time since the association of the virtual address was changed from the first physical address of the asymmetric memory component of the main memory to the second physical address of the symmetric memory component of the main memory has elapsed:
  lowering the first threshold amount of storage to a second threshold amount of storage; and
  using the second threshold amount of storage to determine whether the collection of content entries collectively occupy the threshold amount of storage after the first amount of time has elapsed.

32. The method of claim 1 wherein loading the collection of content entries to the selected region of the asymmetric memory component using the block write command comprises:
  loading data corresponding to the virtual address for which the association was changed back to the asymmetric memory component; and
  configuring the page table to change the association of the virtual address from the association to the second physical address of the symmetric memory component of the main memory to a third physical address of the asymmetric memory component of the main memory.

33. The method of claim 1 further comprising:
  tracking memory access characteristics for the virtual address for which the association was changed;
  determining whether data corresponding to the virtual address for which the association was changed remains suitable for storage in the asymmetric memory component based on the tracked memory access characteristics; and
  in response to a determination that data corresponding to the virtual address for which the association was changed no longer remains suitable for storage in the asymmetric memory component, removing the data corresponding to the virtual address for which the association was changed from the collection of content entries.

34. The method of claim 1 wherein identifying the collection of one or more content entries with access characteristics suitable for storage in the asymmetric memory component comprises identifying multiple content entries with access characteristics suitable for storage in the asymmetric memory component.

35. A method of integrating data stored within symmetric and asymmetric memory components of main memory and storing the resultant integrated data within at least one asymmetric memory component, where the symmetric memory components are each configured to enable random access write operations in which an address within a block of the symmetric memory component is written without affecting the availability of other addresses within the block of the symmetric memory component, and where the asymmetric memory components are each configured to enable block write operations in which a write to an address within a block of one of the asymmetric memory components affects the availability of other addresses within the block of the asymmetric memory component, the method comprising:
  identifying a first data as having access characteristics suitable for storing in an asymmetric memory component;
  including the first data among a collection of data to be written to the asymmetric memory component;
  identifying an amount of data within the collection of data to be written to the asymmetric memory component;
  comparing the amount of data within the collection of data to a volume threshold to determine whether a block write to the asymmetric memory component is justified by the amount of data; and
  in response to a determination that a block write to the asymmetric memory component is justified by the amount of data:
    identifying memory utilization characteristics of multiple regions included in the asymmetric memory component;
    analyzing the identified memory utilization characteristics;
    based on the analysis of the identified memory utilization characteristics, selecting, from among the multiple regions included in the asymmetric memory component, a region in the asymmetric memory component; and
    loading the collection of data to the selected region of the asymmetric memory component.

36. The method of claim 35 wherein identifying the first data as having the access characteristics suitable for storing in the asymmetric memory component includes determining that the first data is an update to second data that was previously stored in the asymmetric memory component.

37. The method of claim 35 wherein including the first data among a collection of data to be written to the asymmetric memory component includes loading the first data to an organization location in a symmetric memory component.

38. The method of claim 37 wherein loading the first data to the organization location in the symmetric memory component includes loading the first data from an original location in the asymmetric memory component.

39. The method of claim 37 wherein loading the first data to the organization location in the symmetric memory component includes loading the first data from an original location in the symmetric memory component.

40. The method of claim 35 wherein including the first data among a collection of data to be written to the asymmetric memory component includes structuring the first data in a block format for use in a block write.

41. The method of claim 35 wherein including the first data among a collection of data to be written to the asymmetric memory component includes structuring the first data in a specialized format for use in a sequence of block writes to a bank.

42. The method of claim 35 further comprising triggering comparison of the amount of data within the collection of data to the volume threshold based upon occurrence of a first threshold number of read operations.

43. The method of claim 35 further comprising triggering comparison of the amount of data within the collection of data to the volume threshold based upon occurrence of a second threshold number of write operations.

44. The method of claim 35 further comprising triggering comparison of the amount of data within the collection of data to the volume threshold based upon occurrence of a third threshold period of time.

45. The method of claim 35 wherein identifying the first data as having the access characteristics suitable for storing in the asymmetric memory component includes:
    comparing the first data to second data that has already been added to the collection of data; and
    identifying the first data as having content relating to other content appearing in the second data that has already been added to the collection of data.

46. The method of claim 35 wherein identifying the first data as having the access characteristics suitable for storing in the asymmetric memory component includes:
    identifying a data structure for the first data;
    comparing the data structure to second data that has already been added to the collection of data; and
    identifying the first data as being part of a same data structure as the second data that has already been added to the collection of data.

47. A system that integrates data stored within symmetric and asymmetric memory components of main memory and storing the resultant integrated data within at least one asymmetric memory component, where the symmetric memory components are each configured to enable random access write operations in which an address within a block of the symmetric memory component is written without affecting the availability of other addresses within the block of the symmetric memory component, and where the asymmetric memory components are each configured to enable block write operations in which a write to an address within a block of one of the asymmetric memory components affects the availability of other addresses within the block of the asymmetric memory component, the system comprising:
    means for receiving a write command to write data to a virtual address associated with a first physical address of an asymmetric memory component of the main memory;
    means for configuring a page table to change an association of the virtual address from the association to the first physical address of the asymmetric memory component of the main memory to a second physical address of a symmetric memory component of the main memory;
    means for generating an indication that the first physical address is available for association with another virtual address in a subsequent block write operation;
    means for identifying a collection of one or more content entries with access characteristics suitable for storage in the asymmetric memory component, the collection of content entries including data corresponding to the virtual address for which the association was changed from the first physical address of the asymmetric memory component of the main memory to the second physical address of the symmetric memory component of the main memory;
    means for determining whether the collection of content entries collectively occupy a threshold amount of storage or whether a threshold period of time has elapsed since the association of the virtual address was changed from the first physical address of the asymmetric memory component of the main memory to the second physical address of the symmetric memory component of the main memory; and
    means for, in response to determining that the collection of content entries collectively occupy the threshold amount of storage or that the threshold period of time has elapsed:
        identifying memory utilization characteristics of multiple regions included in the asymmetric memory component;
        analyzing the identified memory utilization characteristics;
        based on the analysis of the identified memory utilization characteristics, selecting, from among the multiple regions included in the asymmetric memory component, a region in the asymmetric memory component; and
        loading the collection of content entries to the selected region of the asymmetric memory component using a block write command.

48. A system that integrates data stored within symmetric and asymmetric memory components of main memory and storing the resultant integrated data within at least one asymmetric memory component, where the symmetric memory components are each configured to enable random access write operations in which an address within a block of the symmetric memory component is written without affecting the availability of other addresses within the block of the symmetric memory component, and where the asymmetric memory components are each configured to enable block write operations in which a write to an address within a block of one of the asymmetric memory components affects the availability of other addresses within the block of the asymmetric memory component, the system comprising
    means for identifying a first data as having access characteristics suitable for storing in an asymmetric memory component;
    means for including the first data among a collection of data to be written to the asymmetric memory component;
    means for identifying an amount of data within the collection of data to be written to the asymmetric memory component;
    means for comparing the amount of data within the collection of data to a volume threshold to determine whether a block write to the asymmetric memory component is justified by the amount of data; and
    means for, in response to a determination that a block write to the asymmetric memory component is justified by the amount of data:
        identifying memory utilization characteristics of multiple regions included in the asymmetric memory component;
        analyzing the identified memory utilization characteristics;
        based on the analysis of the identified memory utilization characteristics, selecting, from among the multiple regions included in the asymmetric memory component, a region in the asymmetric memory component; and
        loading the collection of data to the selected region of the asymmetric memory component.

49. A system that integrates data stored within symmetric and asymmetric memory components of main memory and storing the resultant integrated data within at least one asymmetric memory component, where the symmetric memory components are each configured to enable random access write operations in which an address within a block of the symmetric memory component is written without affecting the availability of other addresses within the block of the symmetric memory component, and where the asymmetric memory components are each configured to enable block write operations in which a write to an address within a block of one of the asymmetric memory components affects the availability of other addresses within the block of the asymmetric memory component, the system comprising logic that when executed on a processor cause the processor to:
- identify a first data as having access characteristics suitable for storing in an asymmetric memory component;
- include the first data among a collection of data to be written to the asymmetric memory component;
- identify an amount of data within the collection of data to be written to the asymmetric memory component;
- compare the amount of data within the collection of data to a volume threshold to determine whether a block write to the asymmetric memory component is justified by the amount of data; and
- in response to a determination that a block write to the asymmetric memory component is justified by the amount of data:
  - identify memory utilization characteristics of multiple regions included in the asymmetric memory component;
  - analyze the identified memory utilization characteristics;
  - based on the analysis of the identified memory utilization characteristics, select, from among the multiple regions included in the asymmetric memory component, a region in the asymmetric memory component; and
  - load the collection of data to the selected region of the asymmetric memory component.

50. A system that integrates data stored within symmetric and asymmetric memory components of main memory and storing the resultant integrated data within at least one asymmetric memory component, where the symmetric memory components are each configured to enable random access write operations in which an address within a block of the symmetric memory component is written without affecting the availability of other addresses within the block of the symmetric memory component, and where the asymmetric memory components are each configured to enable block write operations in which a write to an address within a block of one of the asymmetric memory components affects the availability of other addresses within the block of the asymmetric memory component, the system comprising logic that when executed on a processor cause the processor to:
- receive a write command to write data to a virtual address associated with a first physical address of an asymmetric memory component of the main memory;
- configure a page table to change an association of the virtual address from the association to the first physical address of the asymmetric memory component of the main memory to a second physical address of a symmetric memory component of the main memory;
- generate an indication that the first physical address is available for association with another virtual address in a subsequent block write operation;
- identify a collection of one or more content entries with access characteristics suitable for storage in the asymmetric memory component, the collection of content entries including data corresponding to the virtual address for which the association was changed from the first physical address of the asymmetric memory component of the main memory to the second physical address of the symmetric memory component of the main memory;
- determine whether the collection of content entries collectively occupy a threshold amount of storage or whether a threshold period of time has elapsed since the association of the virtual address was changed from the first physical address of the asymmetric memory component of the main memory to the second physical address of the symmetric memory component of the main memory; and
- in response to determining that the collection of content entries collectively occupy the threshold amount of storage or that the threshold period of time has elapsed:
  - identify memory utilization characteristics of multiple regions included in the asymmetric memory component;
  - analyze the identified memory utilization characteristics;
  - based on the analysis of the identified memory utilization characteristics, select, from among the multiple regions included in the asymmetric memory component, a region in the asymmetric memory component; and
  - load the collection of content entries to the selected region of the asymmetric memory component using a block write command.

* * * * *